(12) United States Patent
Drzymala et al.

(10) Patent No.: US 10,515,244 B2
(45) Date of Patent: Dec. 24, 2019

(54) BARCODE READER WITH ALIGNED LINEAR FIELDS OF VIEW

(71) Applicant: SYMBOL TECHNOLOGIES, LLC, Lincolnshire, IL (US)

(72) Inventors: Mark Drzymala, Saint James, NY (US); Edward Barkan, Miller Place, NY (US); Carl D. Wittenberg, Water Mill, NY (US)

(73) Assignee: Symbol Technologies, LLC, Holtsville, NY (US)

( * ) Notice: Subject to any disclaimer, the term of this patent is extended or adjusted under 35 U.S.C. 154(b) by 0 days.

(21) Appl. No.: 15/928,174

(22) Filed: Mar. 22, 2018

(65) Prior Publication Data

US 2019/0294838 A1    Sep. 26, 2019

(51) Int. Cl.
  *G06K 7/10*    (2006.01)
  *G06K 7/14*    (2006.01)

(52) U.S. Cl.
  CPC ..... *G06K 7/10722* (2013.01); *G06K 7/10881* (2013.01); *G06K 7/1413* (2013.01); *G06K 2007/10524* (2013.01)

(58) Field of Classification Search
  CPC ............. G06K 7/10722; G06K 7/1413; G06K 7/10881; G06K 2007/10524
  See application file for complete search history.

(56) References Cited

U.S. PATENT DOCUMENTS 9,185,306 B1 *   11/2015   Tan .................... G06K 7/10801

* cited by examiner

*Primary Examiner* — Sonji N Johnson
(74) *Attorney, Agent, or Firm* — Yuri Astvatsaturov

(57) ABSTRACT

The present disclosure generally relates to devices, systems, and methods associated with optical data capture. In some embodiments, the present invention is a barcode reader that includes a first linear imaging assembly, a second linear imaging assembly, and an aiming assembly configured to emit a linear aiming light pattern, where the aiming light pattern is planarly aligned with the fields of view of the first and second imaging assemblies.

20 Claims, 18 Drawing Sheets

BARCODE READER WITH ALIGNED LINEAR FIELDS OF VIEW

FIELD OF INVENTION

At least some embodiments of the present invention generally relate to devices, systems, and methods associated with optical data capture, and more specifically to devices, systems, and methods for illuminating barcodes and capturing barcode data.

BACKGROUND

Barcode readers have been and continue to be used in a wide variety of applications. In some instances, these readers need to be operable over a relatively wide range of working distances to allow the user to capture barcode data up close and far away, depending on the position of the barcode. For example, in a warehouse having tall ceilings with vertically extending shelves, a barcode operator may need to read barcodes that are positioned both near the floor and close to the ceiling.

To address this need, barcode readers have been designed with multiple imaging assemblies where each imaging assembly has a limited range that is less than the entire working distance. While such implementations have proved to be advantageous on some level, the creation of multiple fields of view that result from using multiple imaging assemblies along with appropriate aiming assistance continue to create roadblocks, particularly in the area of seamlessly transitioning between using the reader for close-up operation and using the reader for further away operation.

Accordingly, there continues to exist a need for improved devices, systems, and methods that are designed to improve operability of a barcode reader across the entire working range while having multiple imaging assemblies.

SUMMARY

Accordingly, at least some embodiments of the present invention are directed towards devices, systems, and methods that are designed to improve operability of a barcode reader across the entire working range while having multiple imaging assemblies.

In an embodiment, the present invention is a barcode reader that includes: a housing defining a cavity; a first imaging assembly positioned within the cavity, the first imaging assembly having a first linear imaging sensor and a first lens assembly, the first imaging assembly having a first linear field of view (FOV); a second imaging assembly positioned within the cavity, the second imaging assembly having a second linear imaging sensor and a second lens assembly, the second imaging assembly being separate from the first imaging assembly, the second imaging assembly having a second linear FOV; and an aiming assembly positioned within the cavity, the aiming assembly having an aiming illumination source and an aiming beam shaper, the aiming assembly being configured to emit a linear aiming light pattern, wherein the first linear FOV, the second linear FOV, and the linear aiming light pattern are coplanar.

In another embodiment, the present invention is a method of manufacturing a barcode reader. The method includes: providing a housing having a cavity; positioning a first imaging assembly within the cavity, the first imaging assembly having a first linear imaging sensor and a first lens assembly, the first imaging assembly being positioned such that it has a first linear FOV; positioning a second imaging assembly within the cavity, the second imaging assembly having a second linear imaging sensor and a second lens assembly, the second imaging assembly being separate from the first imaging assembly, the second imaging assembly being positioned such that it has a second linear FOV; and positioning an aiming assembly within the cavity, the aiming assembly having an aiming illumination source and an aiming beam shaper, the aiming assembly being configured to emit a linear aiming light pattern, wherein the first linear FOV, the second linear FOV, and the linear aiming light pattern extend over the same plane.

In yet another embodiment, the present invention is a method of installing a lens assembly having a protrusion within a chassis having a slot extending through a cavity wall, the cavity wall defining at least a portion of the cavity, the lens assembly having a corresponding imaging sensor positioned fixedly relative to the chassis. The method includes: providing the chassis having a cavity configured to receive the lens assembly; positioning the lens assembly within the chassis such that the protrusion is positioned within the slot, the lens assembly being free-floating relative to the chassis; adjusting the lens assembly relative to the imaging sensor while the lens assembly is free-floating relative to the chassis; and upon meeting an adjustment threshold, fixedly securing the lens assembly to the chassis.

In still yet another embodiment, the present invention is an imaging apparatus that includes: a housing having a window; a chassis positioned inside the housing, the chassis having a cavity and a slot extending through a cavity wall, the cavity wall defining at least a portion of the cavity; an imaging sensor positioned fixedly relative to the chassis; and a lens assembly having a protrusion, the lens assembly being positioned within the cavity such that the protrusion is positioned within the slot, the lens assembly being further positioned between the imaging sensor and the window, wherein the lens assembly is fixedly secured to the chassis only via a hardened adhesive.

In still yet another embodiment, the present invention is a barcode reader that includes: a housing having a window; a chassis positioned inside the housing, the chassis having a cavity and a slot extending through a cavity wall, the cavity wall defining at least a portion of the cavity; an imaging sensor positioned fixedly relative to the chassis; and a lens assembly having a protrusion, the lens assembly being positioned within the cavity such that the protrusion is positioned within the slot, the lens assembly being further positioned between the imaging sensor and the window, wherein the lens assembly is fixedly secured to the chassis only via a hardened adhesive.

In still yet another embodiment, the present invention is a chassis for use in an imaging apparatus having an imaging sensor positioned fixedly relative to the chassis and a window. The chassis includes a cavity; a slot extending through a cavity wall, the cavity wall defining at least a portion of the cavity; and a lens assembly having a protrusion, the lens assembly being positioned within the cavity such that the protrusion is positioned within the slot, where the lens assembly is fixedly secured to the chassis only via a hardened adhesive.

In still yet another embodiment, the present invention is an imaging engine including: a first imaging assembly having a first FOV, the first imaging assembly configured capture image data over a first working distance range; a second imaging assembly having a second FOV, the second imaging assembly configured to capture image data over a second working distance range, the first working distance range extending further than the second working distance range; and an aiming assembly configured to emit an aiming light pattern, the aiming light pattern including a first portion and a second portion, the first portion configured to provide a visual indication of at least one of approximate boundaries of the first FOV and a central region of the first FOV, the second portion configured to provide a visual indication of approximate boundaries of the second FOV.

In still yet another embodiment, the present invention is an imaging engine including: a first imaging assembly having a first FOV, the first imaging assembly configured capture image data over a first working distance range extending between a first far-working distance (FWD1) and a second far-working distance (FWD2), the FWD1 being closer to the first imaging assembly than the FWD2; a second imaging assembly having a second FOV, the second imaging assembly configured to capture image data over a second working distance range extending between a first near-working distance (NWD1) and a second near-working distance (NWD2), the NWD1 being closer to the second imaging assembly than the NWD2, the first working distance extending further than the second working distance range; and an aiming assembly configured to emit an aiming light pattern, the aiming light pattern including a first portion and a second portion, the second portion having a first sub-portion and a second sub-portion separated from the first sub-portion by a space, wherein the aiming assembly is configured such that when the aiming light pattern is projected on a working surface positioned between the NWD2 and the FWD2, each of the first sub-portion and the second sub-portion is outside of the first FOV.

In still yet another embodiment, the present invention is an imaging engine including: a first imaging assembly having a first FOV, the first imaging assembly configured capture image data over a first working distance range extending between a first far-working distance (FWD1) and a second far-working distance (FWD2), the FWD1 being closer to the first imaging assembly than the FWD2; a second imaging assembly having a second FOV, the second imaging assembly configured to capture image data over a second working distance range extending between a first near-working distance (NWD1) and a second near-working distance (NWD2), the NWD1 being closer to the second imaging assembly than the NWD2, the first working distance extending further than the second working distance range; and an aiming assembly configured to emit an aiming light pattern, the aiming light pattern including a first portion and a second portion, wherein the aiming assembly is configured such that when the aiming light pattern is projected on a working surface positioned at the NWD2, the second portion has a second light intensity of 5 foot-candles (ft-c) to 10 ft-c and the first portion has a first light intensity that is greater than the second light intensity.

In still yet another embodiment, the present invention is an imaging engine for use in an environment having a predetermined ambient light intensity, including: a first imaging assembly having a first FOV, the first imaging assembly configured capture image data over a first working distance range extending between a first far-working distance (FWD1) and a second far-working distance (FWD2), the FWD1 being closer to the first imaging assembly than the FWD2; a second imaging assembly having a second FOV, the second imaging assembly configured to capture image data over a second working distance range extending between a first near-working distance (NWD1) and a second near-working distance (NWD2), the NWD1 being closer to the second imaging assembly than the NWD2, the first working distance extending further than the second working distance range; and an aiming assembly configured to emit an aiming light pattern, the aiming light pattern including a first portion and a second portion, wherein the aiming assembly is configured such that when the aiming light pattern is projected on a working surface positioned at the NWD2, the second portion has a second light intensity that is between one fifth and one fifteenth of the predetermined ambient light intensity.

In still yet another embodiment, the present invention is an imaging engine including: a first imaging assembly having a first FOV, the first imaging assembly configured capture image data over a first working distance range; a second imaging assembly having a second FOV, the second imaging assembly configured to capture image data over a second working distance range, the first working distance range extending further than the second working distance range; and an aiming assembly configured to emit an aiming light pattern, the aiming light pattern being produced by a laser light source, the aiming light pattern including a first portion and a second portion, the first portion configured to correlate with the first FOV, the second portion configured to correlate with the second FOV, wherein the aiming light pattern is configured such that a combined power of any part of the aiming light pattern encompassed by a 7 mrad cone, as measured from the aiming assembly, is less than or equal to 1 mW.

These and other features, aspects, and advantages of the present disclosure will become better-understood with reference to the following drawings, description, and any claims that may follow.

DRAWINGS

DETAILED DESCRIPTION

Figure 1:
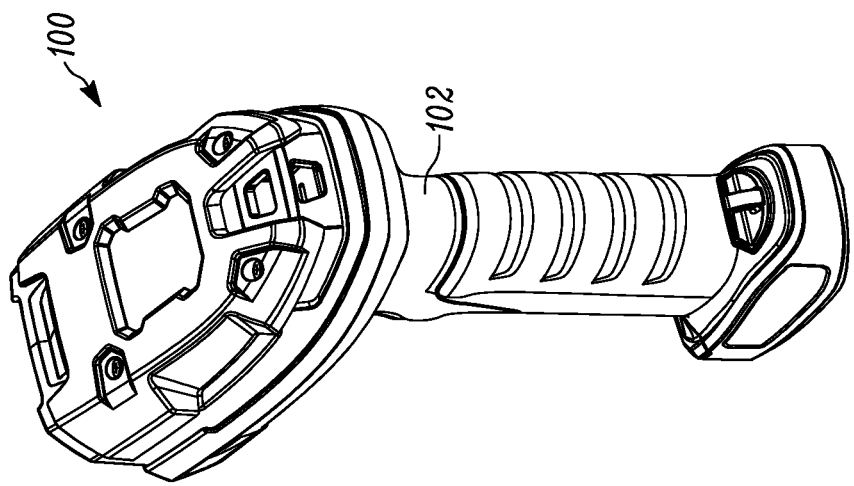
FIG. 1 illustrates front and rear perspective views of a barcode reader, in accordance with an embodiment of the present invention.
Figure 1:
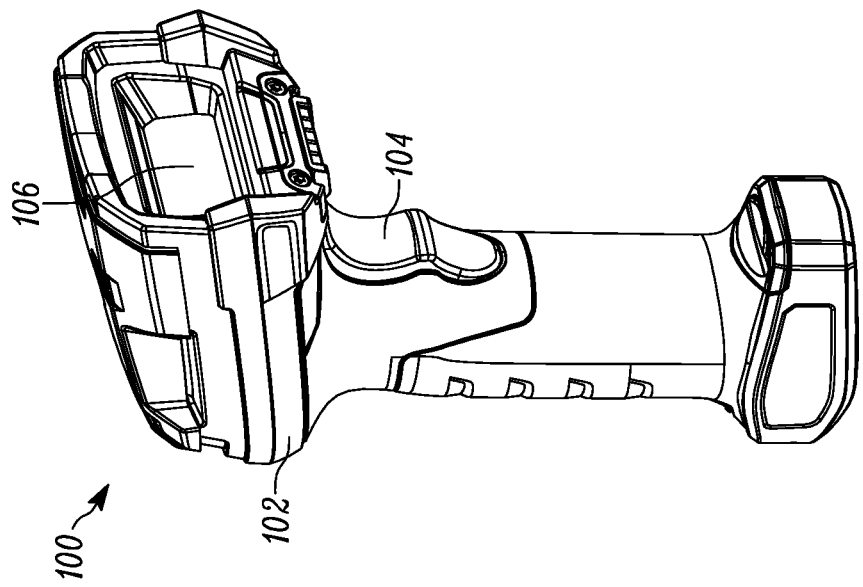

Referring to FIG. 1, shown therein is an exemplary barcode reader 100 having a housing 102 with a cavity for housing internal components, a trigger 104, and a window 106. The barcode reader 100 can be used in a hands-free mode as a stationary workstation when it is placed on the countertop in a supporting cradle (not shown). The barcode reader 100 can also be used in a handheld mode when it is picked up off the countertop (or any other surface) and held in an operator's hand. In the hands-free mode, products can be slid, swiped past, or presented to the window 106. In the handheld mode, the barcode reader 100 can be aimed at a barcode on a product, and the trigger 104 can be manually depressed to initiate imaging of the barcode. In some implementations, the supporting cradle can be omitted, and the housing 102 can also be in other handheld or non-handheld shapes.

Figure 2:
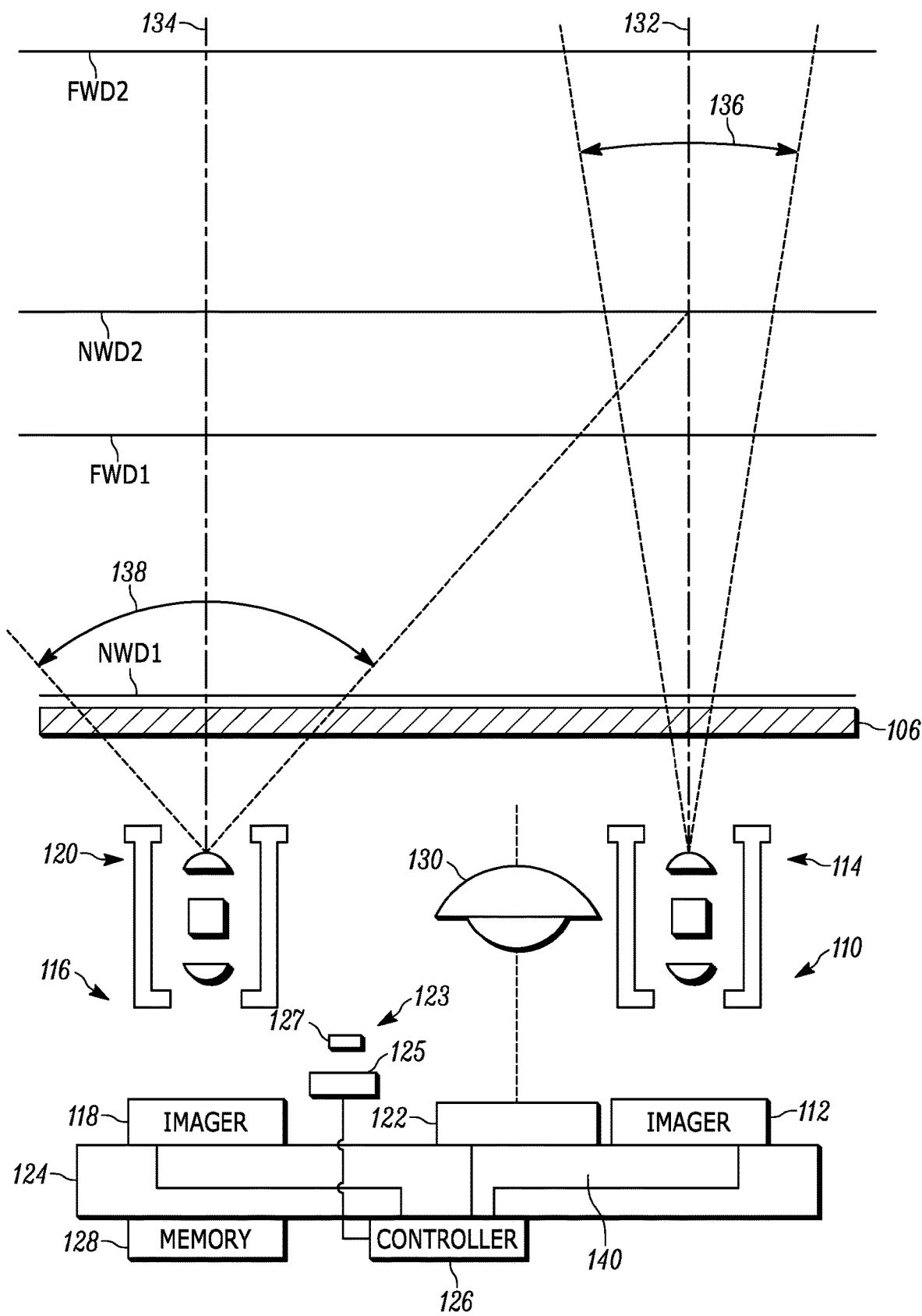
FIG. 2 illustrates a block schematic diagrams of a portion of a barcode reader, in accordance with an embodiment of the present invention.

FIG. 2 illustrates a block schematic diagrams of a portion of a barcode reader 100 in accordance with some embodiments. It should be understood that FIG. 2 is not drawn to scale. The barcode reader 100 in FIG. 2 includes the following components: (1) a first imaging assembly 110 that includes a first linear imaging sensor 112 and a first lens assembly 114; (2) a second imaging assembly 116 that includes a second linear imaging sensor 118 and a second lens assembly 120; (3) an illumination source 122; (4) an aiming light assembly 123 having an aiming light source 125 and an aiming lens assembly 127 (also referred to as an aiming beam shaper); (5) a printed circuit board (PCB) 124 supporting the first and second linear imaging sensors 112, 118, and the illumination source 122; (6) a controller 126 positioned on the PCB 124 and communicatively coupled to the first and second linear imaging sensors 112, 118, and the illumination source 124; (7) a memory 128 connected to the controller 126; and (8) an illumination lens assembly 130 positioned in front of the illumination source 122. In referring to portions of the barcode reader, may be grouped and referred to as an "imaging engine." In some instances, the imaging engine can be said to include image capture components like the image sensor(s). In other instances, the imaging engine can be said to include additional elements such as, for example, an aiming light assembly.

The first and second linear imaging sensors 112, 118 can be either CCD or CMOS linear imaging sensors that generally include multiple photosensitive pixel elements aligned in one-dimensional array. The first and second linear imaging sensors 112, 118 are operative to detect light captured, respectively, by the first and second lens assemblies 114, 120 along a respective optical path or axis 132, 134 through the window 106. Generally, each respective linear imaging sensor and imaging lens assembly pair is designed to operate together for capturing light scattered, reflected, or emitted from a barcode as pixel data over a one-dimensional field of view (FOV) extending along a respective linear FOV plane. However, each lens/imaging sensor pair (also referred to as an optical assembly) is configured with different parameters.

In the currently described embodiment, the first imaging assembly 110 is designed to read barcodes over a relatively far working distance range that extends between FWD1 and FWD2. In some embodiments, FWD1 is approximately 24 inches from the window 106 and FWD2 is approximately 600 to 680 inches from the window 106. In some embodiments, FWD2 extends beyond 680 inches. Additionally, imaging assembly 110 captures light from a relatively narrow FOV 136. On the other hand, the second optical assembly 116 is designed to read barcodes over a relatively near working distance range that extends between NWD1 and NWD2. In some embodiments, NWD1 is approximately 0 inches from the window 106 and NWD2 is approximately 28 to 32 inches from the window 106. Additionally, imaging assembly 116 captures light from a relatively wider FOV 138.

Figure 3A:
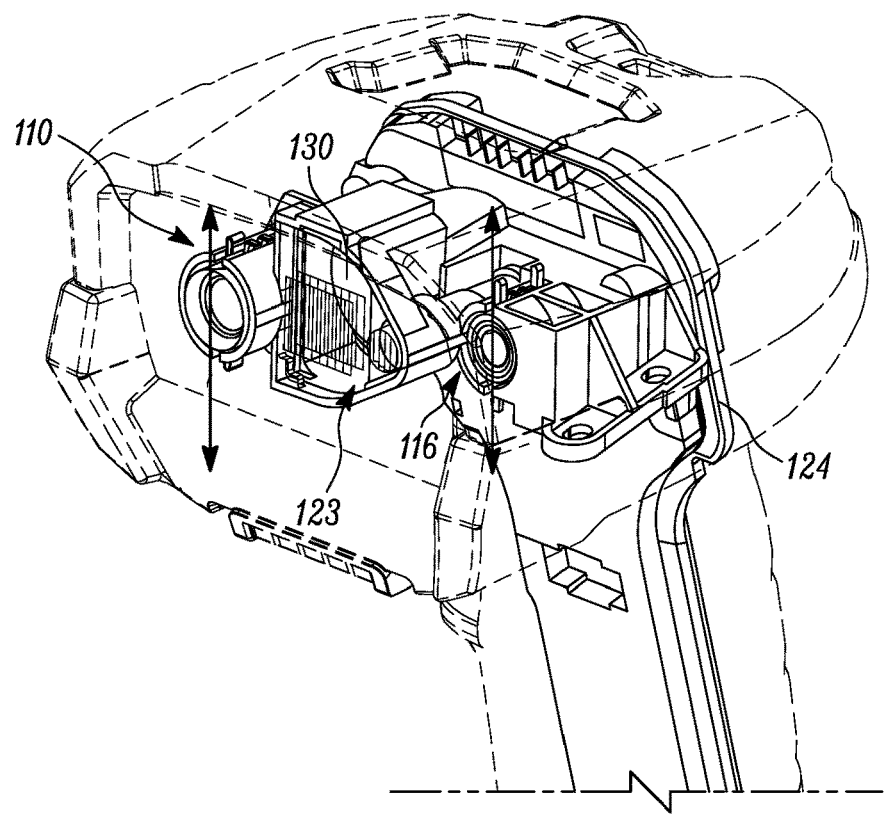
FIG. 3A illustrates a perspective view of some components a barcode reader, in accordance with an embodiment of the present invention.
Figure 3B:
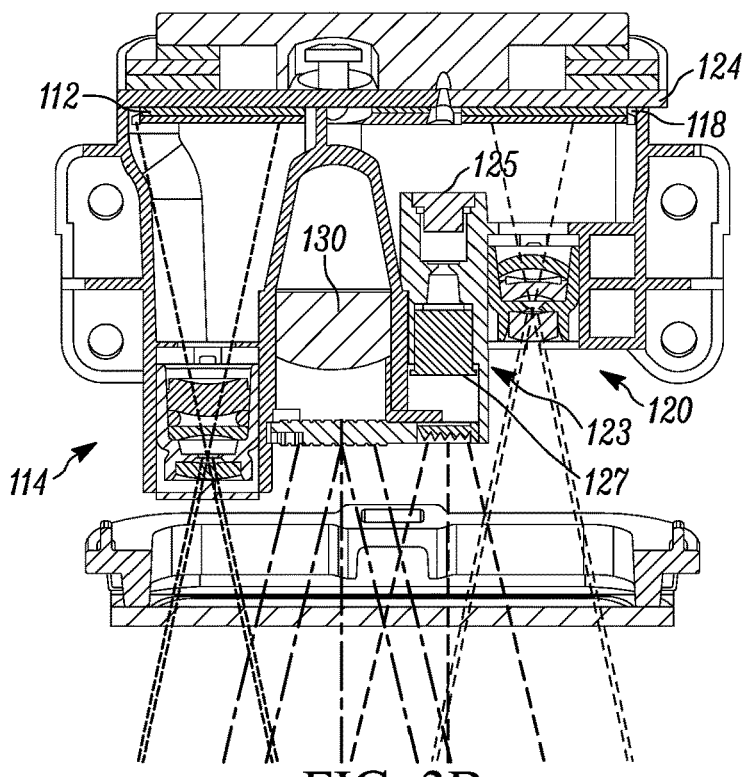
FIG. 3B illustrates a top cut-away view of the components of FIG. 3A.
Figure 4:
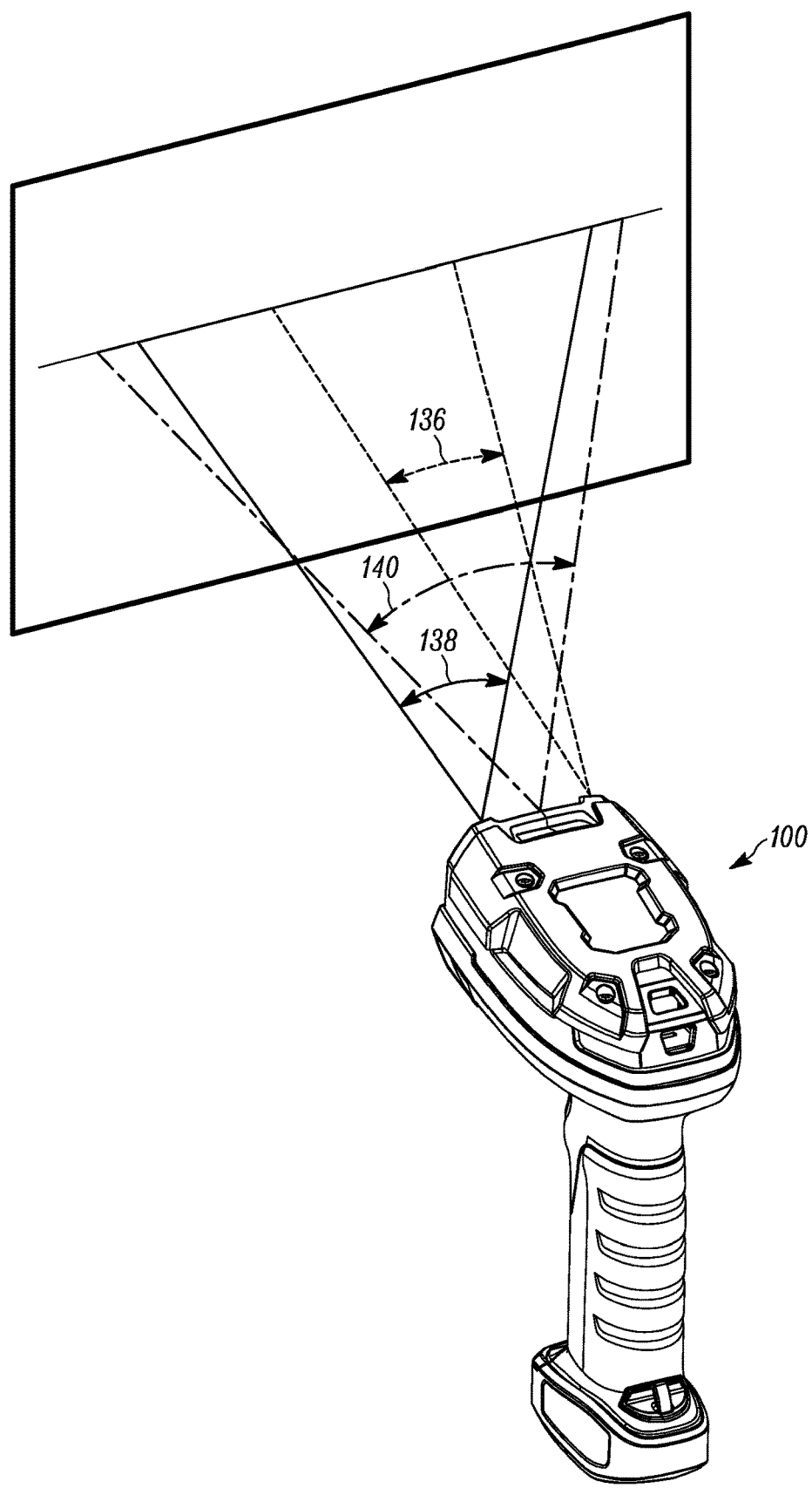
FIG. 4 illustrates fields of view and an aiming light pattern field, in accordance with an embodiment of the present invention.

An example of the component arrangement of FIG. 2 is illustratively shown in a perspective view of FIG. 3A and the top cut-away view of FIG. 3B which show some components of the reader 100 in a partially assembled form. In this embodiment, the aiming assembly is positioned between the first imaging assembly and the second imaging assembly. In a preferred configuration, the aiming assembly is positioned closer to the second (near) imaging assembly than the first imaging (far) assembly. This can be advantageous as the shift of the aiming light pattern relative to the FOV of the second (near) imaging assembly due to parallax is reduced. Additionally, in the embodiment shown in FIGS. 3A and 3B, the first linear imaging sensor 112 and the second linear imaging sensor 118 are positioned on a substrate (such as a PCB 124) such that a distance between the first linear imaging sensor 112 and the first lens assembly 114 is different from a distance between the second linear imaging sensor 118 and the second lens assembly 120. Furthermore, the imaging assemblies and the aiming assembly can be situated such that their respective fields of view (which are shown as being coplanar in FIGS. 4 and 5) and the respective planes along which they extend form an oblique angle relative to a PCB plane that is defined by the lengthwise and widthwise directions of the PCB 124.

Figure 3C:
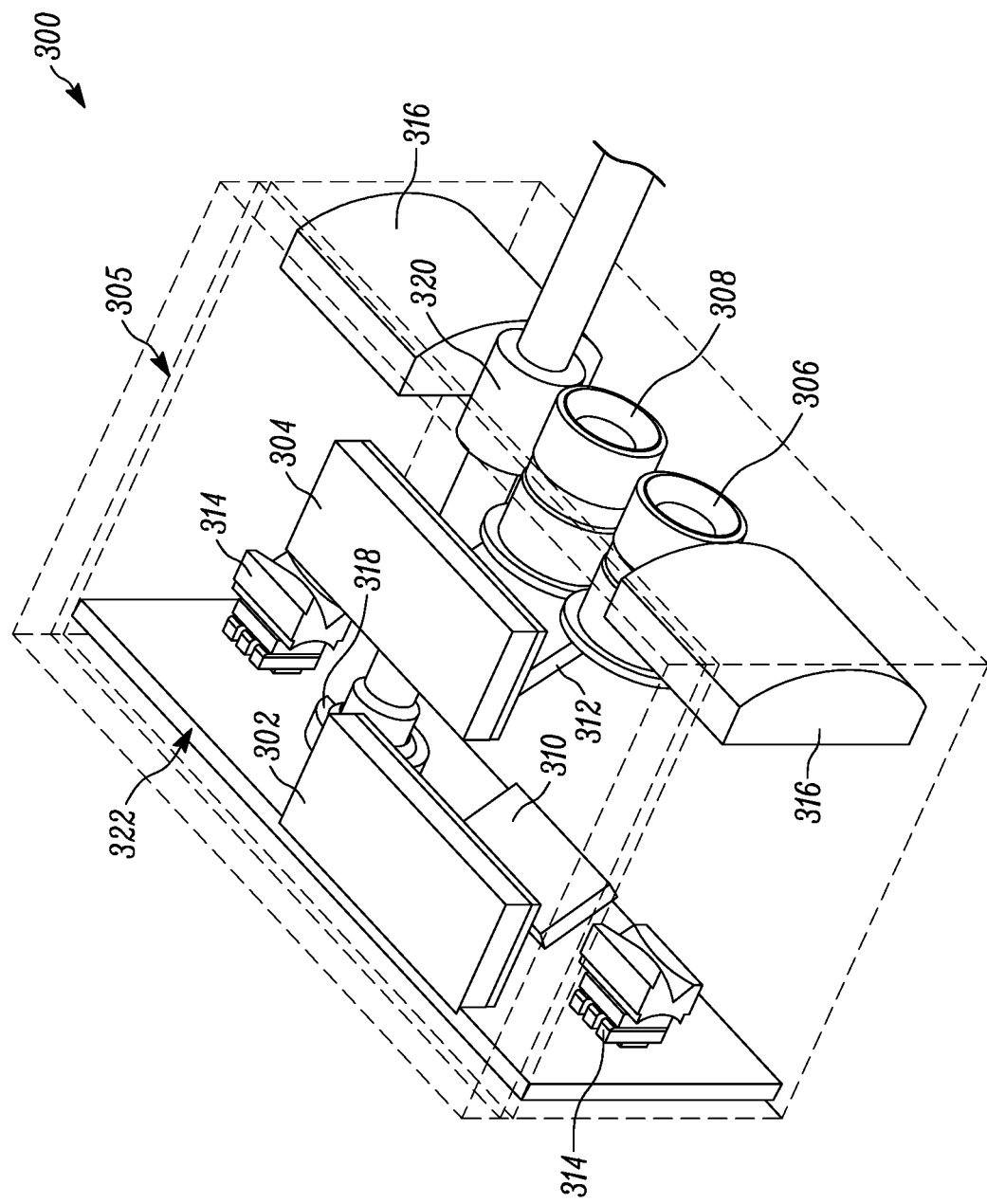
FIG. 3C illustrates a perspective view of some components a barcode reader, in accordance with an embodiment of the present invention.

An alternate embodiment of the component arrangement 300 of FIG. 2 is shown in FIG. 3C. In this embodiment, both the first linear imaging sensor 302 and the second linear imaging sensor 304 are positioned on a substrate 305 that is parallel to the central axis of each of the first lens assembly 306 and the second lens assembly 308. To allow the image sensors to capture light directed by each lens assembly, imaging fold mirrors 310 and 312 are used to redirect the light from the lens assemblies toward their respective image sensors. It should be understood that while this embodiment is shown with the image sensors being positioned a particular angle relative to the lens assemblies, this angle may be varied as desired and the functionality of the component arrangement may still be maintained with the appropriate adjustment of the fold mirrors. Further to the above, the embodiment of FIG. 3C also includes at least one illumination assembly comprising an illumination source (e.g., LEDs) 314 and an illumination lens, and an aiming assembly comprising an aiming light source (e.g., laser) 318 and an aiming beam shaper 320 (e.g., a lens and/or a micro-lens array). The illumination source 314 and the aiming light source 318 are mounted on a second substrate (e.g., PCB) 322.

Figure 5:
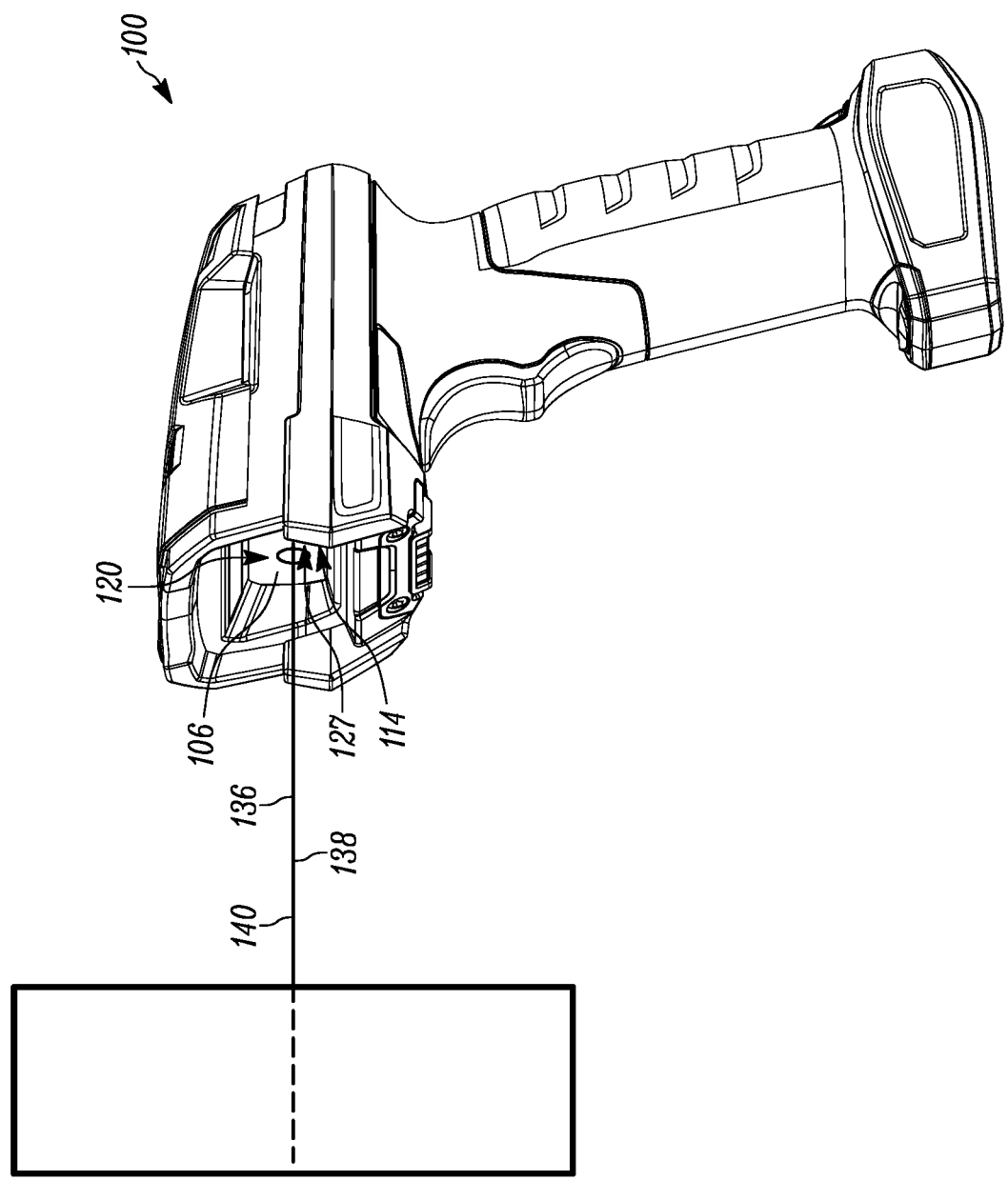
FIG. 5 illustrates a rotated side view of FIG. 4.

In a preferred embodiment of the reader 100, the aiming assembly 123 is configured to emit a linear aiming light pattern extending along a linear aiming light pattern plane, and the first imaging assembly 110, the second imaging assembly 116, and the aiming assembly 123 are arranged such that the first linear FOV plane of the first imaging assembly 110, the second linear FOV plane of the second imaging assembly 118, and the linear aiming light pattern plane are the same or substantially the same. In other words, the first linear FOV and the second linear FOV extend along the linear aiming light pattern plane. An example of this configuration can be seen in FIG. 4 which shows a barcode reader 100 with a first imaging assembly having a first linear FOV 136, a second imaging assembly having a second linear FOV 138, and an aiming assembly configured to emit a linear aiming light pattern over a field 140. When the fields of view 136, 138 and the linear aiming light pattern field 140 are coplanar, they will begin to overlap, as shown in FIGS. 3B and 5, at some distance away from the reader window and remain overlapped as they continue to extend away from the reader 100.

It will be appreciated that while each of the first FOV, second FOV, and aiming light pattern are referenced as being linear, each of those elements has a relatively small height component. Thus, in some embodiments, the arrangement of having the first linear FOV plane, the second linear FOV plane, and the linear aiming light pattern plane be same includes arrangements when there is at least some overlap between the first linear FOV, the second linear FOV, and the linear aiming light pattern in the vertical direction. This equally applies to embodiments where the arrangement is expressed in terms of the first linear FOV, second linear FOV, and linear aiming light pattern being coplanar. In other words, the first linear FOV, second linear FOV, and linear aiming light pattern can be said to be coplanar when there is at least some overlap between these components in the vertical direction.

Figure 6:
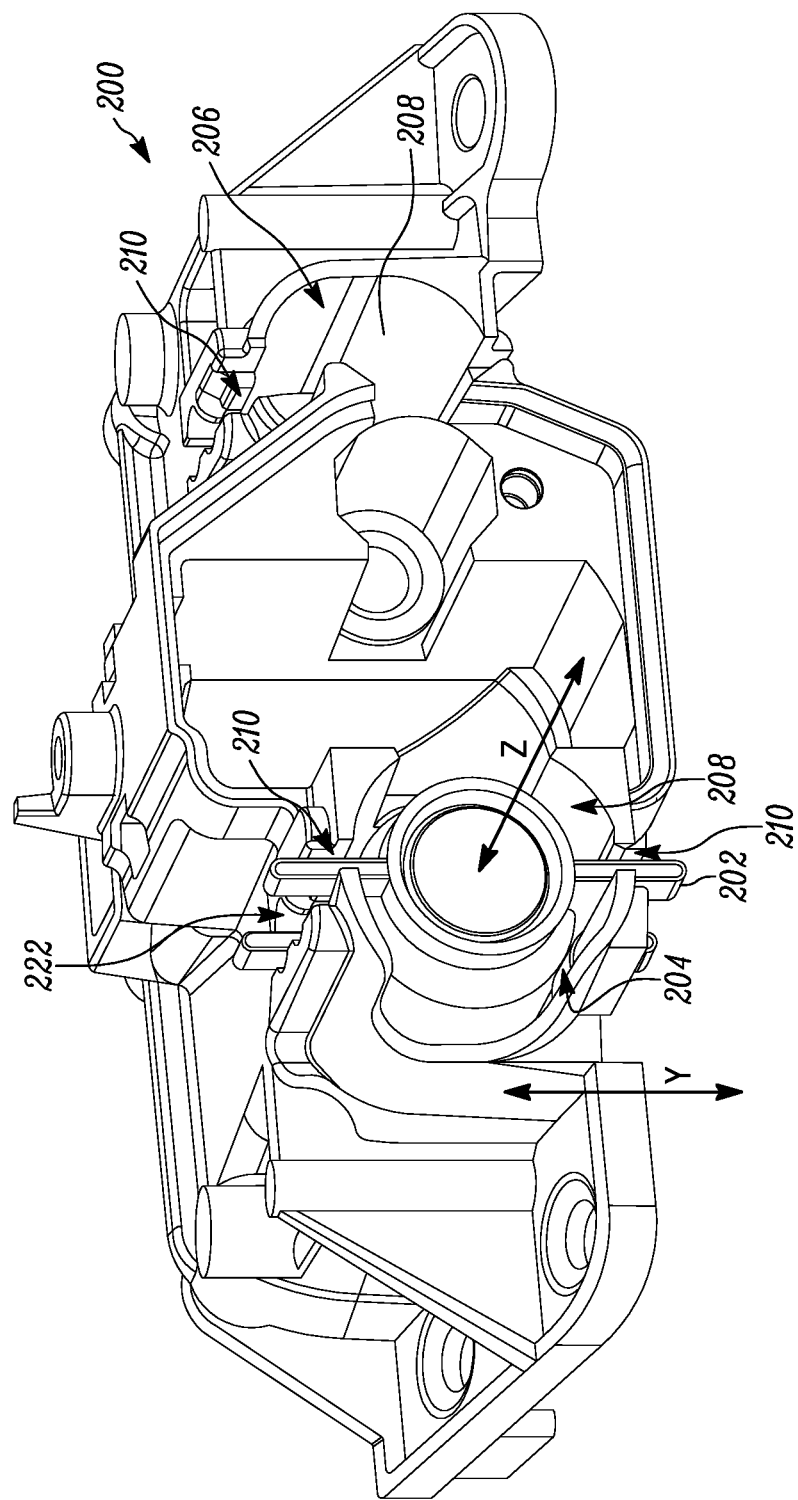
FIG. 6 illustrates a chassis for use in a barcode reader, in accordance with an embodiment of the present invention.
Figure 7:
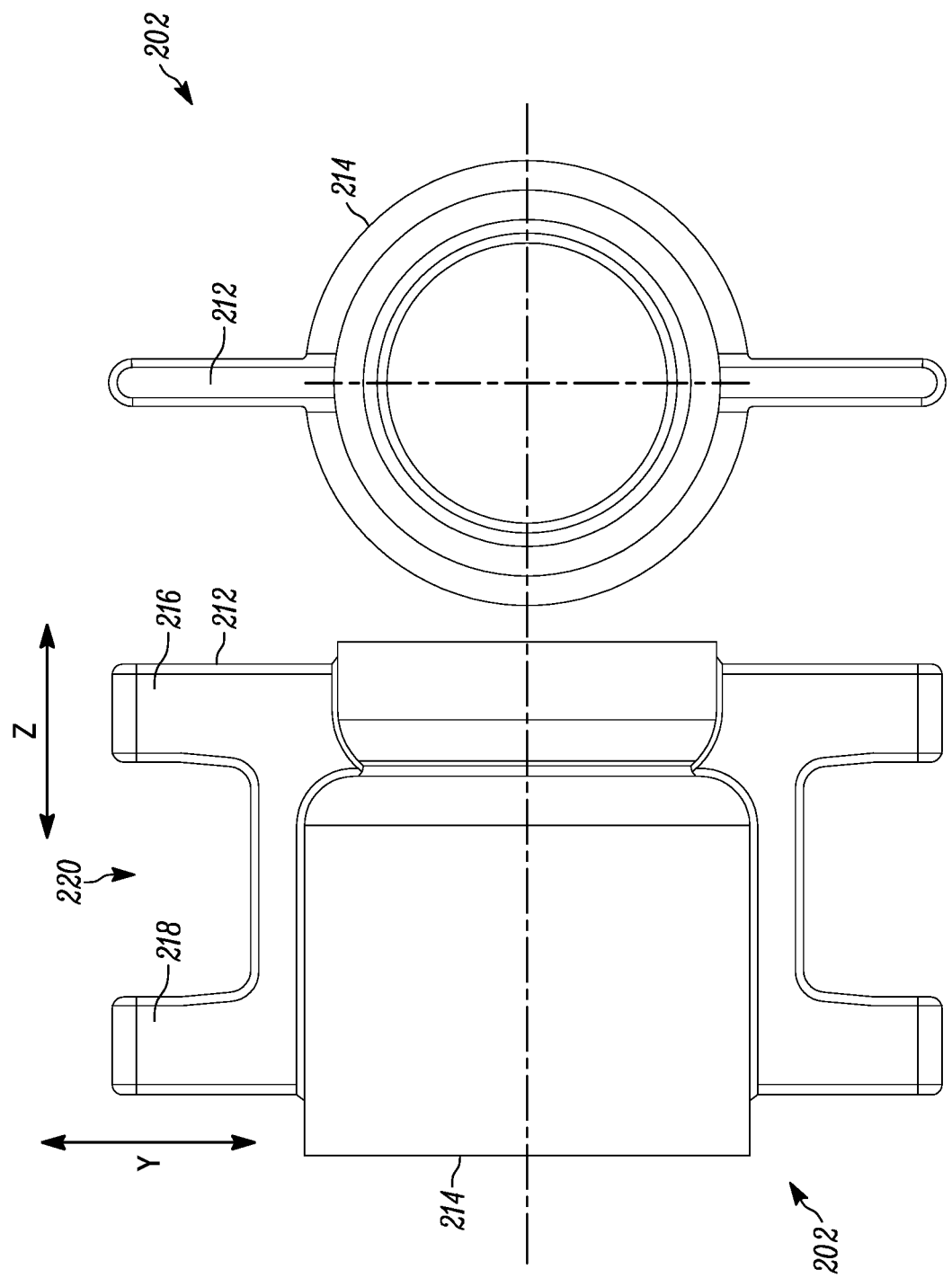
FIG. 7 illustrates front and side view of a lens assembly use in a barcode reader, in accordance with an embodiment of the present invention.

In an embodiment, the aforementioned alignment can be attained by utilizing a chassis 200 and lens assemblies 202, as shown in FIGS. 6 and 7. Chassis 200 is configured to be fixedly secured to the substrate on which the imaging sensors are mounted. This can be done via any suitable securing features including, but not limited to, screws, fasteners, adhesive, clips, stakes, etc. When used in the embodiment of FIG. 3A, the chassis 200 can be fixedly secured to the PCB 124 such that it is also fixedly positioned relative to the image sensors (also referred to as "imagers"). Alternately or alternatively, the chassis 200 may be fixedly secured to the housing of the reader 100. In this case, the chassis would be fixedly positioned relative to the image sensors by virtue of the substrate on which the imaging sensors are installed also being fixedly secured to the housing. It should be understood that a relative relationship of one element relative to another should be viewed as being reciprocal. As such, chassis 200 being fixedly positioned relative to an imaging sensor should also be understood as the imaging sensor being fixedly positioned relative to the chassis 200.

As shown in FIG. 6, chassis 200 includes two cavities 204, 206 configured to receive respective lens assemblies 202. When used in the embodiments of FIGS. 2-3B, the lens assembly positioned in the cavity 204 could correspond to the lens assembly 114 used with the far imaging sensor 112 and the lens assembly positioned in the cavity 206 could correspond to the lens assembly 120 used with the near imaging sensor 118. Each cavity is defined by a cavity wall 208 that could either fully or partially define the respective cavity. The cavity wall includes at least one slot 210 that extends therethrough from the interior of the cavity to the outside of the chassis. While in FIG. 6 the slot 210 is shown to extend longitudinally, relative to the overall orientation of the chassis 200 and its positioning within the reader 200, other non-limiting configurations (e.g., transverse and angled) are also within the scope of this disclosure.

Mounted in the cavities are lens assemblies 202. The overall physical characteristics and/or the optical properties of the lens assemblies may be same or they may be different, as required by different applications. As seen more clearly in FIG. 7, the lens assemblies 202 have a generally barrel-like shape with one or more optical elements (such as a lens) positioned therein. When more than one optical element is provided, the collection of elements can be aligned along a central axis that extends longitudinally through the lens assembly. The lens assembly 202 includes at least one protrusion that is configured to be positioned within the slot 210 of the chassis 200 when the lens assembly 202 is installed in the chassis 200. In the currently described embodiment, the protrusion is depicted as a flange 212 that extends longitudinally along a body 214 of the lens assembly 202. The flange 212 includes a first flange portion 216, a second flange portion 218, and a cutout 220 separating the first flange portion 214 and the second flange portion 218.

Figure 8:
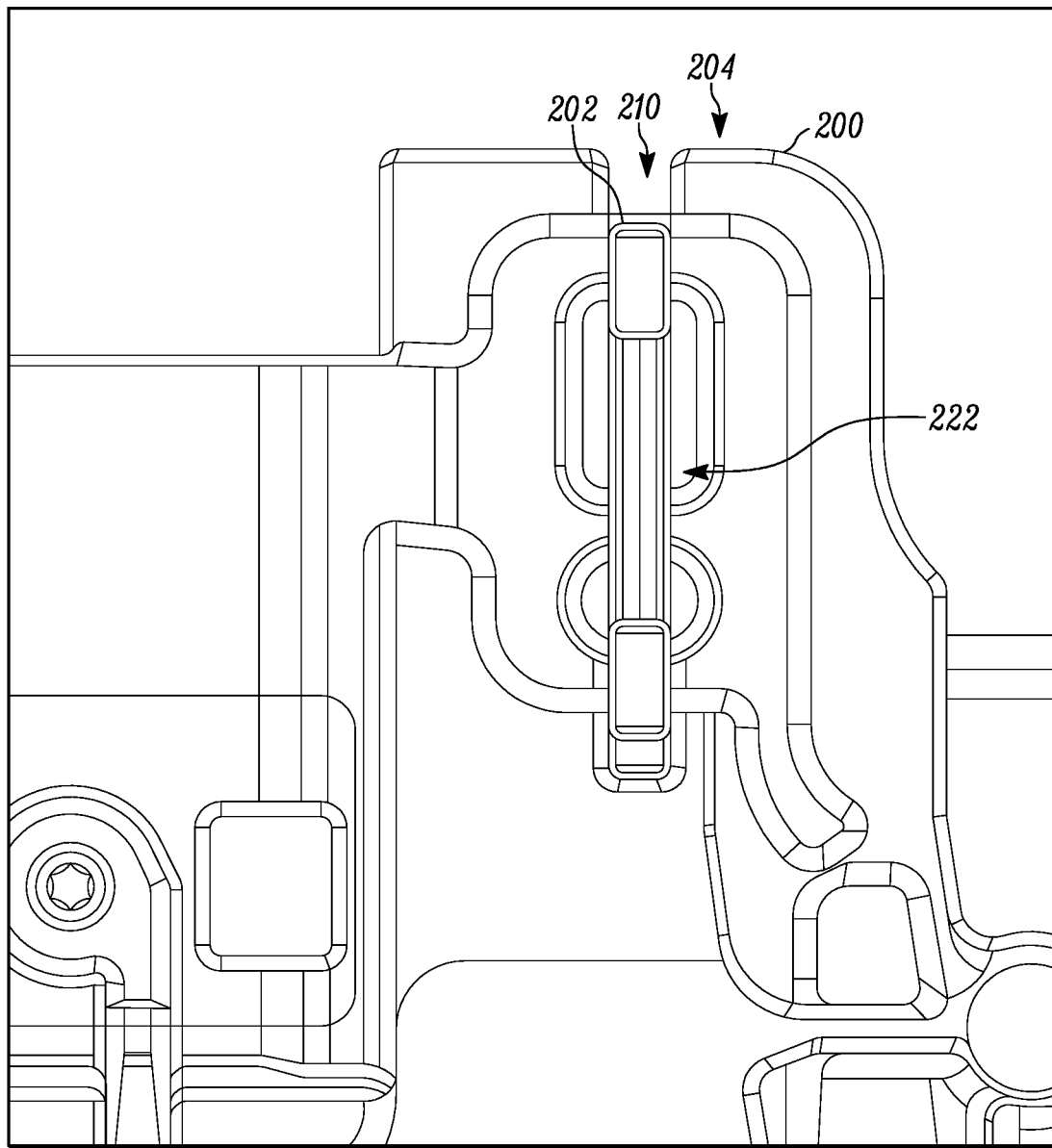
FIG. 8 is a top view of a portion of the chassis of FIG. 6.

Installation of the lens assembly 202 of the current embodiment in the chassis 200 positions the flange(s) 212 in the respective slot(s) 210 such that the first and second flange portions 216, 218 are accessible from outside of the chassis 200 and the cutout 220 forms a channel 222 extending along a portion of the slot 210. Once positioned and sufficiently adjusted, the lens assembly 202 is fixedly secured to the chassis 202 via a suitable hardenable adhesive which, in some embodiments, is a UV curable adhesive that hardens upon exposure to UV light. Preferably, the adhesive is deposited in the channel 222 (see FIG. 8) such that it contacts at least a portion of the slot and at least a portion of the protrusion (in this case the flange 212) locking these two elements relative to each other upon curing.

In an embodiment, prior to being secured, the lens assembly 202 remains free-floating relative to the chassis 200. This can be achieved by supporting the lens assembly via the flange portions from outside the chassis 200 while maintaining some amount of clearance between any part of the lens assembly and the chassis. The free-floating configuration can be particularly advantageous during lens assembly adjustment and securing as it can prevent frictional force between the lens assembly and the chassis which may lead to undesired springback, stick-slip, and other friction-based interactions between the lens assembly and the chassis that may increase the difficulty of accurately adjusting the lens assembly. Additionally, having some amount of clearance between the lens assembly and the wall(s) of the receiving cavity and the slot(s) in a free-floating configuration allows the lens assembly to be adjusted in any direction, including, but not limited to, moving the lens assembly along the Z and Y axis as shown in FIG. 6. It will be appreciated that the degree of adjustment will depend, to some extent, on the amount of clearance between the lens assembly and the chassis.

As noted previously in connection with FIGS. 4 and 5, in a preferred embodiment of the reader 10, the first linear FOV plane of the first imaging assembly 110, the second linear FOV plane of the second imaging assembly 118, and the linear aiming light pattern plane are the same. Due to manufacturing tolerances, attaining such alignment without adjustment may at least be difficult. Accordingly, the adjustability of the lens assemblies 202 relative to the chassis 200 (and thus relative to the imaging sensors) can be taken advantage of during the manufacturing process to properly align both linear fields of view and the aiming light pattern.

Figure 9:
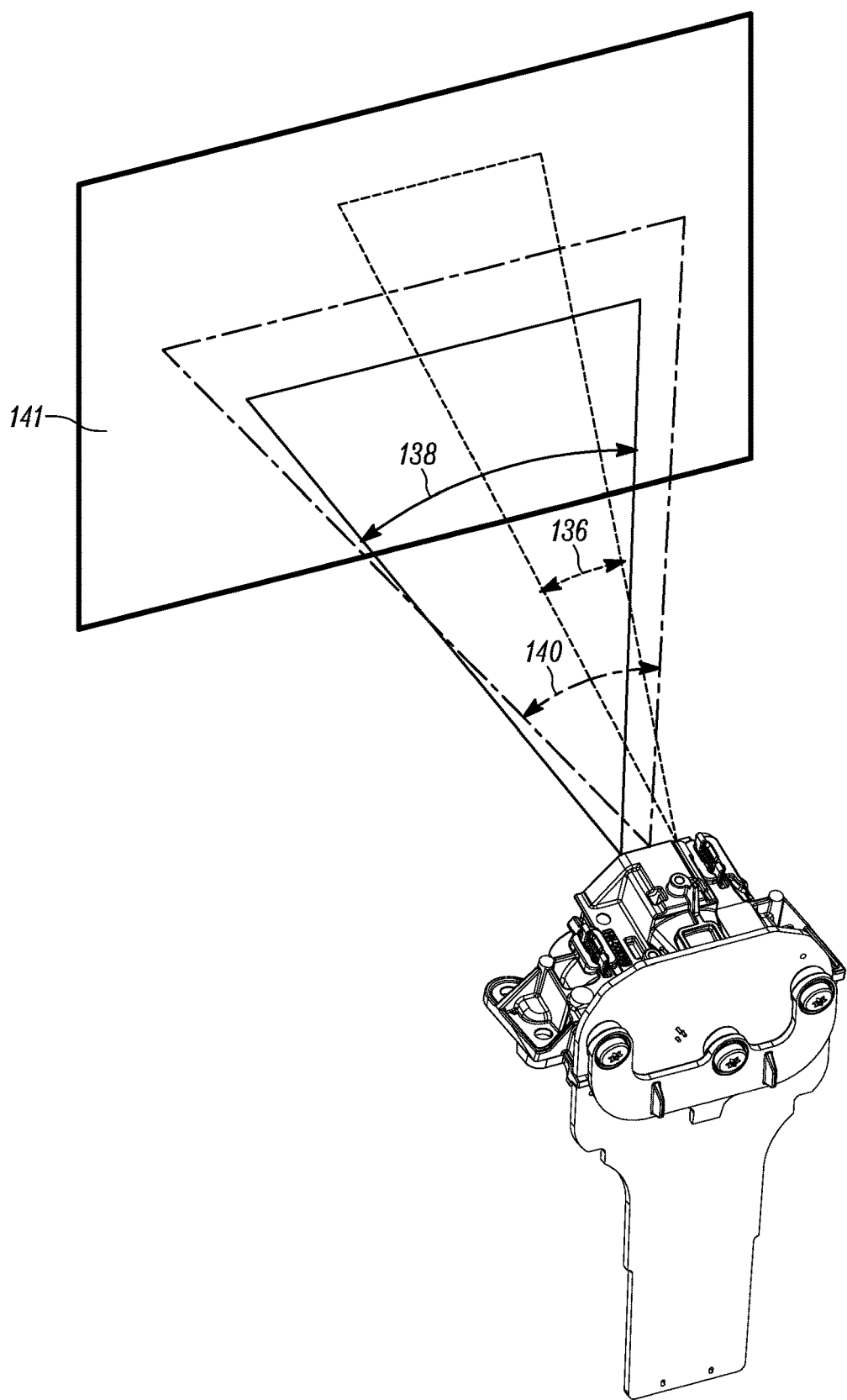
FIG. 9 illustrates an unaligned example of fields of view and aiming light pattern, in accordance with an embodiment of the present invention.

In an embodiment, the coplanar alignment of the fields of view and light pattern is accomplished by first projecting the aiming light pattern on a working surface as a reference point, and thereafter adjusting the position of each lens assembly until each respective linear imaging sensor is indicating a peak response or until the response of the imaging sensor is within a predetermined threshold of the peak, with the peak response corresponding to the imaging sensor capturing the highest recorded amount of the aiming light pattern reflected off the working surface to the imaging sensor. For example, referring to FIG. 9, an initial assembly of the reader's imaging/optical components may reveal a mismatch among the planes of the first linear FOV 136, the second linear FOV 138, and the linear aiming light pattern field 140 when those planes are projected on a working surface 141. Utilizing the method described above, the first lens assembly associated with the first FOV may be adjusted down and the second lens assembly associated with the second FOV may be adjusted up until both of the fields of view 136, 138 sufficiently overlap the aiming light pattern. The correctness of the alignment may further be verified by ensuring the coplanar alignment over a range of working surfaces that span a range of working distances. Upon adjusting the lens assemblies for the appropriate adjustment threshold, the adhesive can be deposited and cured as previously described. In some embodiment, the adhesive is deposited prior to the adjustment of the lens assemblies as this may reduce unintentional disturbance of the lens assembly after it has been adjusted.

It should be understood that while the teachings associated with the lens assembly adjustment disclosed herein have been exemplarily presented in connection with linear sensors, they are equally applicable to the adjustment of lens assemblies in connection with other, non-linear (e.g., 2D) imaging sensors. In other words, structures and methods particularly associated with the disclosed lens assemblies and the chasses should not be limited to application with linear imaging sensors, and should instead be understood to extend to applications with other imaging sensors, like 2D imaging sensors which typically have mutually orthogonal arrays of photosensitive elements arranged on a substantially flat surface.

Figure 10:
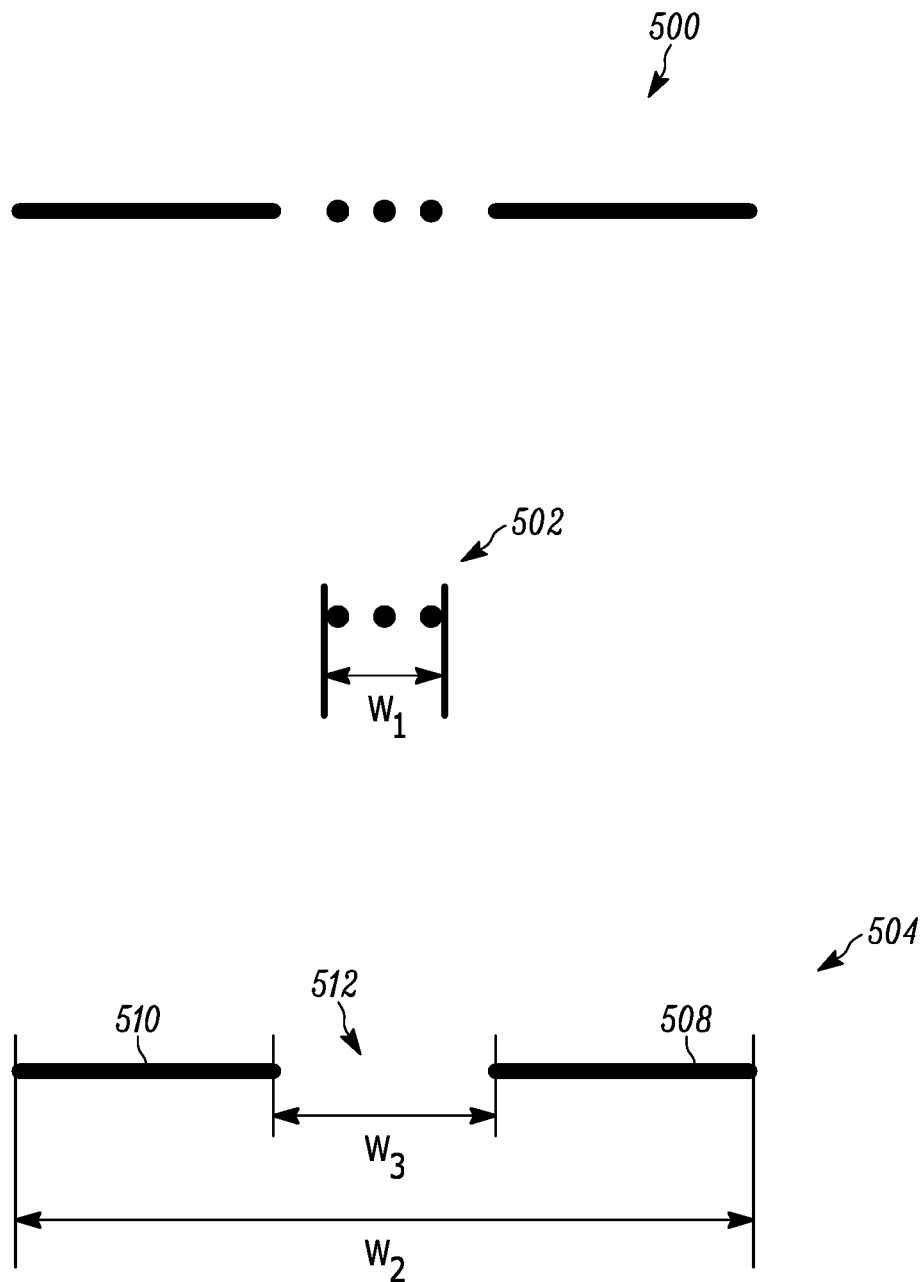
FIG. 10 illustrates an aiming light pattern in accordance with an embodiment of the present invention.
Figure 11:
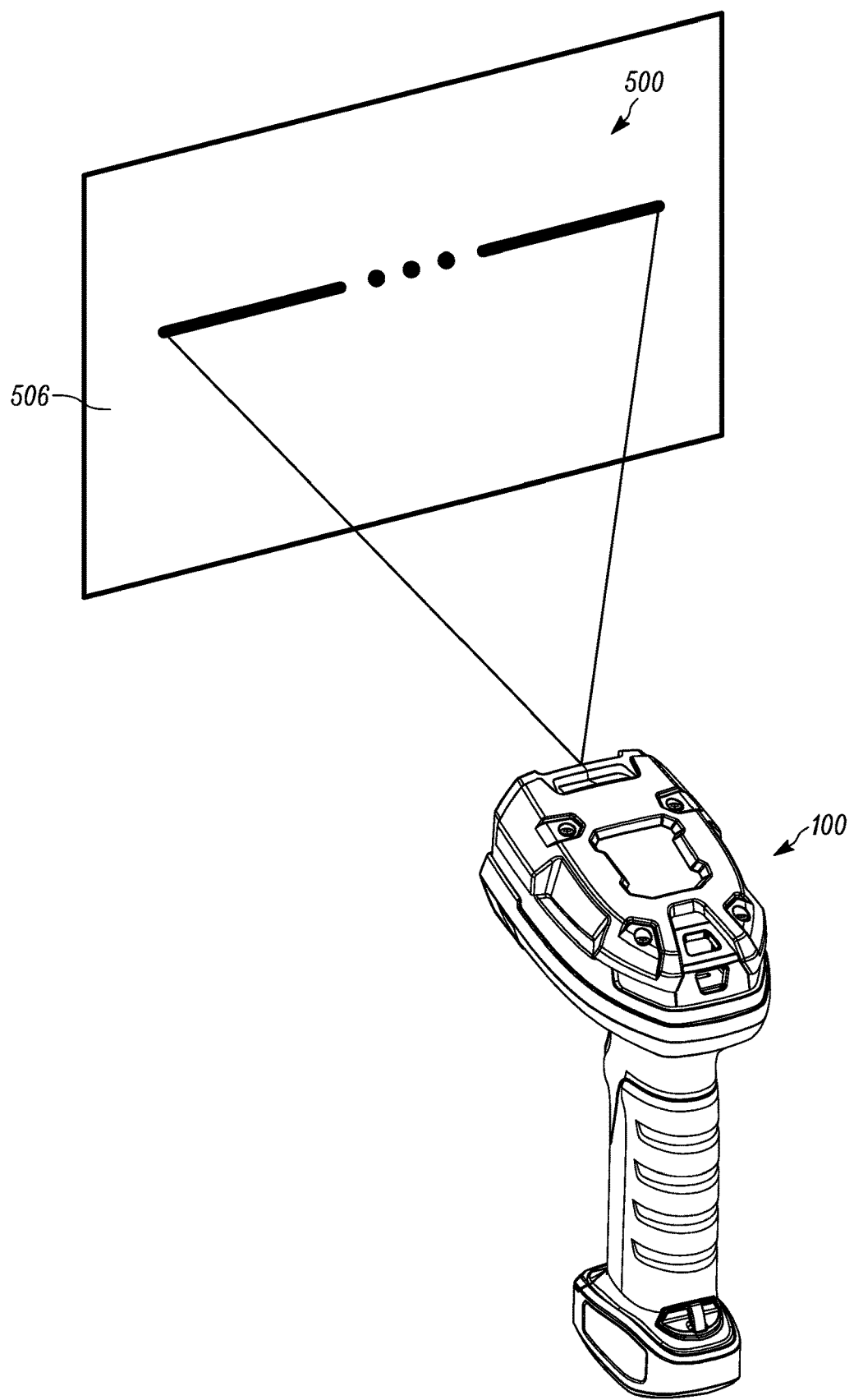
FIG. 11 illustrates a projection of the aiming light pattern of FIG. 10 onto a working surface, in accordance with an embodiment of the present invention.

Referring now to FIGS. 10 and 11, shown therein is an exemplary linear aiming light pattern 500. The aim pattern 500 can be generated by a combination of an aiming light source and a beam shaper both of which can be positioned within the internal cavity of the housing of a barcode reader such as the barcode reader 100. The beam shaper can include, but is not limited to, one or more lenses, one or more prisms, and one or more micro-lens array, each of which can be positioned inside the housing of the reader 100 and/or be integrated with the front window of the reader, such as the window 106 of FIG. 1. When being integrated with the window, the beam shaper (or any part thereof) may be a separate element being attached to the window, it may be integrally formed in the window itself, or any combination thereof. The beam shaper may be configured to alter at least a portion of the light produced by the aiming light source, where the alteration included at least one of splitting, redirecting, diffusing, dispersing, and spreading said portion of the light. In an embodiment, the aiming light source is a laser light source configured to operate within the 630 nm to 680 nm wavelength operating range. In other embodiments, the aiming light source is a visible laser light source configured to operate outside of the 630 nm to 680 nm wavelength operating range.

Referring back to FIG. 10, the aiming light pattern includes two portions. The first portion 502 may be configured to be relatively narrow such that when it is projected on a working surface 506 (see FIG. 11) with the working surface being within the far working distance range of the barcode reader, the overall width $W_1$ of the first portion 502 provides a visual indication of the approximate width-boundaries of the reader's FOV that corresponds to the imaging assembly operable to capture image data over the far working distance. The, first portion 502 may also be configured to be relatively narrow such that when it is projected on a working surface 506 with the working surface being within the far working distance range of the barcode reader, the overall width $W_1$ of the first portion 502 provides a visual indication of the approximate center region of the reader's FOV that corresponds to the imaging assembly operable to capture image data over the far working distance. The second portion 504 is configured to be relatively wide such that when it is projected on a working surface 506 with the working surface being within the near working distance range of the barcode reader, the overall width $W_2$ of the second portion 504 provides a visual indication of the approximate width-boundaries of the reader's FOV that corresponds to the imaging assembly operable to capture image data over the near working distance.

Figure 12:
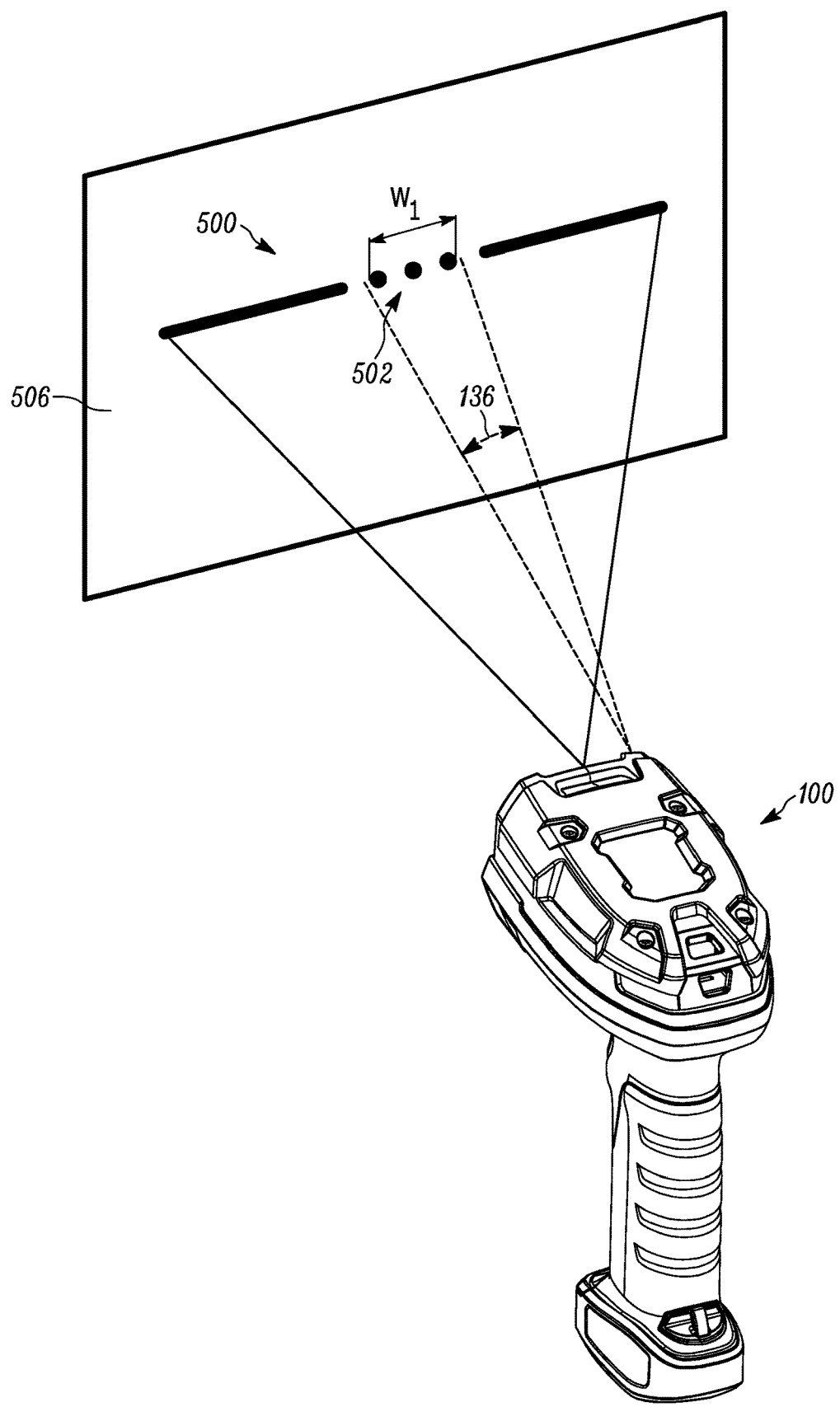
FIG. 12 illustrates a projection of the aiming light pattern of FIG. 10 and a field of view onto a working surface, in accordance with an embodiment of the present invention.
Figure 13:
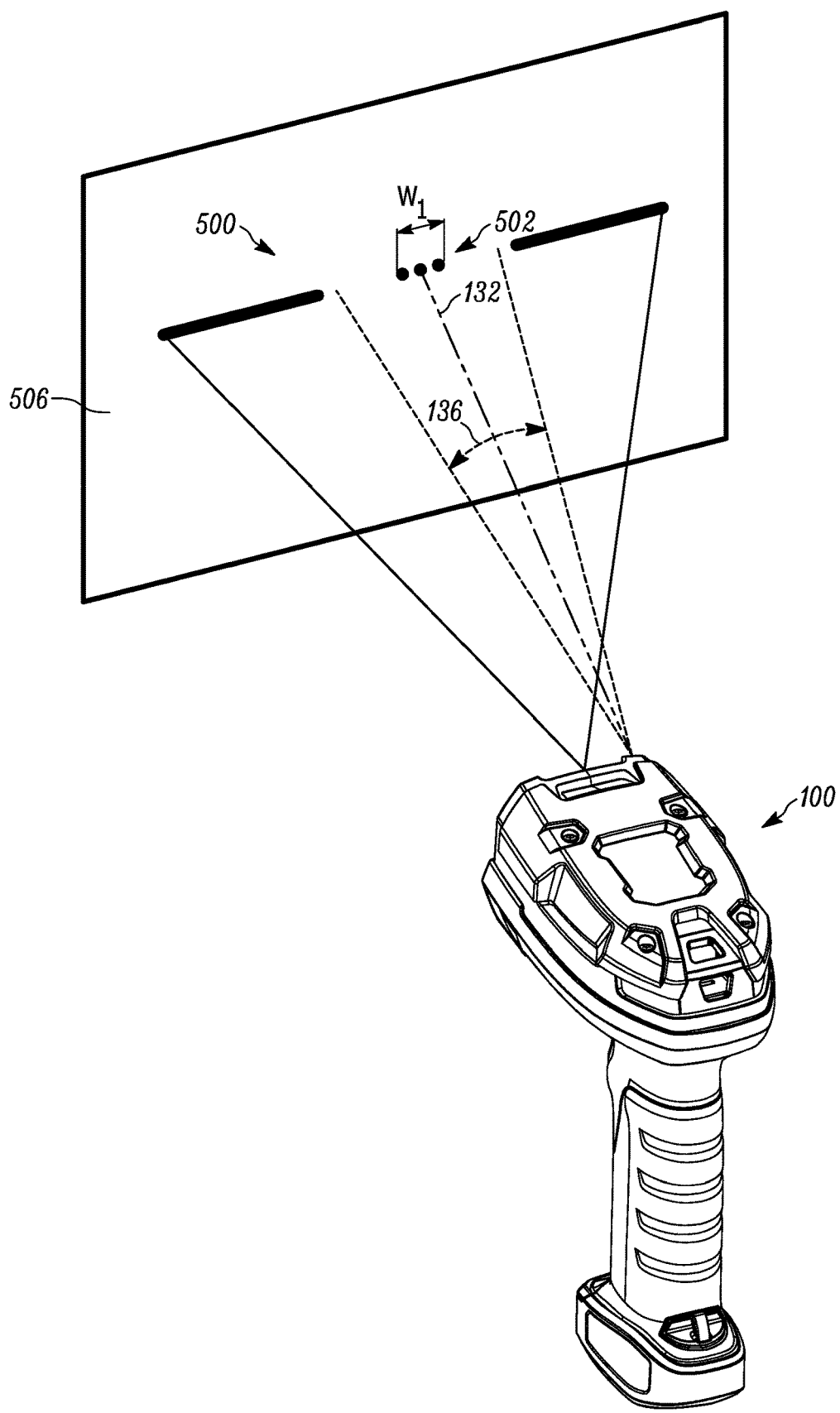
FIG. 13 illustrates a projection of the aiming light pattern of FIG. 10 and a field of view onto a working surface, in accordance with an embodiment of the present invention.
Figure 14:
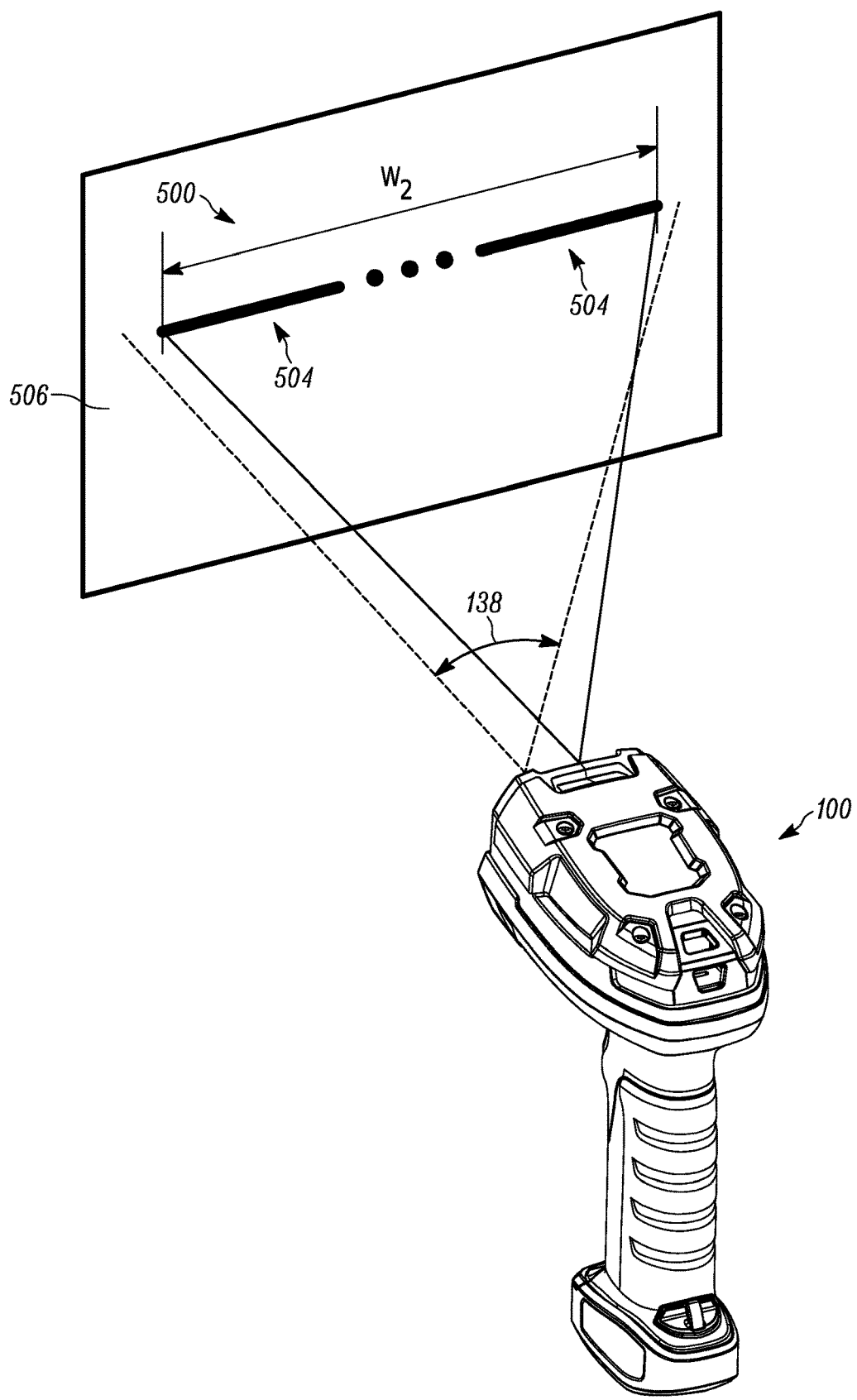
FIG. 14 illustrates a projection of the aiming light pattern of FIG. 10 and another field of view onto a working surface, in accordance with an embodiment of the present invention.

This operation is shown exemplarily in FIGS. 12-14 as it would be implemented with an embodiment of the earlier-described barcode reader 100. In FIG. 12, the barcode reader 100 is positioned within a far working distance range from the working surface, where far working distance range extends between FWD1 and FWD2. As previously described, capture of image data from the far working distance range is done by the far imaging assembly 110 that has a relatively narrow FOV 136. When the aiming light pattern 500 is projected on the working surface 506 that is positioned within the far working distance range, the aiming light pattern is configured to have the width $W_1$ of its first portion 502 substantially correspond to the width of the FOV 136 as that FOV intersects the working surface 506. It will be appreciated that due to the lateral offset of the aiming light source and the far imaging assembly and further due to parallax, the outer boundaries of the first portion 502 that define the width $W_1$ may not always correspond to the boundaries of the FOV. In some embodiment, the first portion 502 of the aiming light pattern 500 may be configured to remain within the boundaries of the FOV 136 throughout the entire far working distance range, shifting laterally as a function of the working distance. In some other embodiments, the first portion 502 may be configured to extend over the boundaries of the FOV 136 throughout the entire far working distance range, again shifting laterally as a function of the working distance. In still some other embodiment, the first portion 502 may be configured to change between being within or extending over the boundary(ies) of the FOV 136, with the change being a function of the working distance. As such, in some embodiments, when the aiming light pattern 500 is projected on the working surface 506 that is positioned within the far working distance range, the aiming light pattern is configured to have the width $W_1$ of its first portion 502 be within +/−5% to the width of the FOV 136 as that FOV intersects the working surface 506. In some other embodiments, when the aiming light pattern 500 is projected on the working surface 506 that is positioned within the far working distance range, the aiming light pattern is configured to have the width $W_1$ of its first portion 502 be within +1-10% to the width of the FOV 136 as that FOV intersects the working surface 506. In still some other embodiments, when the aiming light pattern 500 is projected on the working surface 506 that is positioned within the far working distance range, the aiming light pattern is configured to have the width $W_1$ of its first portion 502 be within +/−15% to the width of the FOV 136 as that FOV intersects the working surface 506. In still yet some other embodiments, when the aiming light pattern 500 is projected on the working surface 506 that is positioned within the far working distance range, the aiming light pattern is configured to have the width $W_1$ of its first portion 502 be within +/−20% to the width of the FOV 136 as that FOV intersects the working surface 506.

In another embodiment, rather than providing a general indication of the width-boundaries of the first FOV, the first portion 502 provides a general indication of the central region of the first FOV. This is exemplarily shown in FIG. 13, where the barcode reader 100 is positioned within a far working distance range from the working surface, where far working distance range extends between FWD1 and FWD2. As previously described, capture of image data from the far working distance range is done by the far imaging assembly 110 that has a relatively narrow FOV 136. When the aiming light pattern 500 is projected on the working surface 506 that is positioned within the far working distance range, the aiming light pattern is configured to have the width $W_1$ of its first portion 502 substantially correspond to the central region of the FOV 136 as that FOV intersects the working surface 506. In some embodiments, a substantial correspondence of the first portion 502 to the central region of the FOV 136 occurs when the first portion 502 overlaps/encompasses the central axis 132 of the FOV 136 and the overall width $W_1$ of the first portion 502 remains within some predetermined percentage of the overall width of the FOV 136. It will be appreciated that due to the lateral offset of the aiming light source and the far imaging assembly and further due to parallax, the outer boundaries of the first portion 502 that define the width $W_1$ may not always be equidistant from the center of the FOV. In other words, the center of the first portion 502 may not always overlap with the central axis 132, and the first portion may be skewed relative to the central axis 132 while still overlapping/encompassing it. Accordingly, in some embodiments, when the aiming light pattern 500 is projected on the working surface 506 that is positioned within the far working distance range, the aiming light pattern 500 is configured such that the first portion 502 overlaps/encompasses the central axis 132 of the FOV 136 and the overall width $W_1$ of the first portion 502 less than 5% of the overall width of the FOV 136. In some embodiments, when the aiming light pattern 500 is projected on the working surface 506 that is positioned within the far working distance range, the aiming light pattern 500 is configured such that the first portion 502 overlaps/encompasses the central axis 132 of the FOV 136 and the overall width $W_1$ of the first portion 502 less than 10% of the overall width of the FOV 136. In some embodiments, when the aiming light pattern 500 is projected on the working surface 506 that is positioned within the far working distance range, the aiming light pattern 500 is configured such that the first portion 502 overlaps/encompasses the central axis 132 of the FOV 136 and the overall width $W_1$ of the first portion 502 less than 15% of the overall width of the FOV 136. In some embodiments, when the aiming light pattern 500 is projected on the working surface 506 that is positioned within the far working distance range, the aiming light pattern 500 is configured such that the first portion 502 overlaps/encompasses the central axis 132 of the FOV 136 and the overall width $W_1$ of the first portion 502 less than 20% of the overall width of the FOV 136. In some embodiments, when the aiming light pattern 500 is projected on the working surface 506 that is positioned within the far working distance range, the aiming light pattern 500 is configured such that the first portion 502 overlaps/encompasses the central axis 132 of the FOV 136 and the overall width $W_1$ of the first portion 502 less than 25% of the overall width of the FOV 136. In some embodiments, when the aiming light pattern 500 is projected on the working surface 506 that is positioned within the far working distance range, the aiming light pattern 500 is configured such that the first portion 502 overlaps/encompasses the central axis 132 of the FOV 136 and the overall width $W_1$ of the first portion 502 between 5% and 30% of the overall width of the FOV 136.

In still yet some other embodiments, when the aiming light pattern 500 is projected on the working surface 506 that is positioned at the far end FWD2 of the far working distance range, the aiming light pattern is configured to have the width $W_1$ of its first portion 502 be between 12 inches and 48 inches. In still yet some other embodiments, when the aiming light pattern 500 is projected on the working surface 506 that is positioned at the far end FWD2 of the far working distance range, the aiming light pattern is configured to have the width $W_1$ of its first portion 502 be between 30 inches and 42 inches.

In FIG. 14, the barcode reader 100 is positioned within a near working distance range from the working surface, where near working distance range extends between NWD1 and NWD2. As previously described, capture of image data from the near working distance range is done by the near imaging assembly 116 that has a relatively wide FOV 138. When the aiming light pattern 500 is projected on the working surface 506 that is positioned within the near working distance range, the aiming light pattern is configured to have the width $W_2$ of its second portion 504 substantially correspond to the width of the FOV 138 as that FOV intersects the working surface 506. It will be appreciated that due to the lateral offset of the aiming light source and the near imaging assembly and further due to parallax, the outer boundaries of the second portion 504 that define the width $W_2$ may not always correspond to the boundaries of the FOV. In some embodiment, the second portion 504 of the aiming light pattern 500 may be configured to remain within the boundaries of the FOV 138 throughout the entire near working distance range, shifting laterally as a function of the working distance. In some other embodiments, the second portion 504 may be configured to extend over the boundaries of the FOV 138 throughout the entire near working distance range, again shifting laterally as a function of the working distance. In still some other embodiment, the second portion 504 may be configured to change between being within or extending over the boundary(ies) of the FOV 138, with the change being a function of the working distance. As such, in some embodiments, when the aiming light pattern 500 is projected on the working surface 506 that is positioned within the near working distance range, the aiming light pattern is configured to have the width $W_2$ of its second portion 504 be within +/−5% to the width of the FOV 138 as that FOV intersects the working surface 506. In some other embodiments, when the aiming light pattern 500 is projected on the working surface 506 that is positioned within the near working distance range, the aiming light pattern is configured to have the width $W_2$ of its second portion 504 be within +/−10% to the width of the FOV 138 as that FOV intersects the working surface 506. In still some other embodiments, when the aiming light pattern 500 is projected on the working surface 506 that is positioned within the near working distance range, the aiming light pattern is configured to have the width $W_2$ of its second portion 504 be within +/−15% to the width of the FOV 138 as that FOV intersects the working surface 506. In still yet some other embodiments, when the aiming light pattern 500 is projected on the working surface 506 that is positioned within the near working distance range, the aiming light pattern is configured to have the width $W_2$ of its second portion 504 be within +/−20% to the width of the FOV 138 as that FOV intersects the working surface 506.

Figure 15:
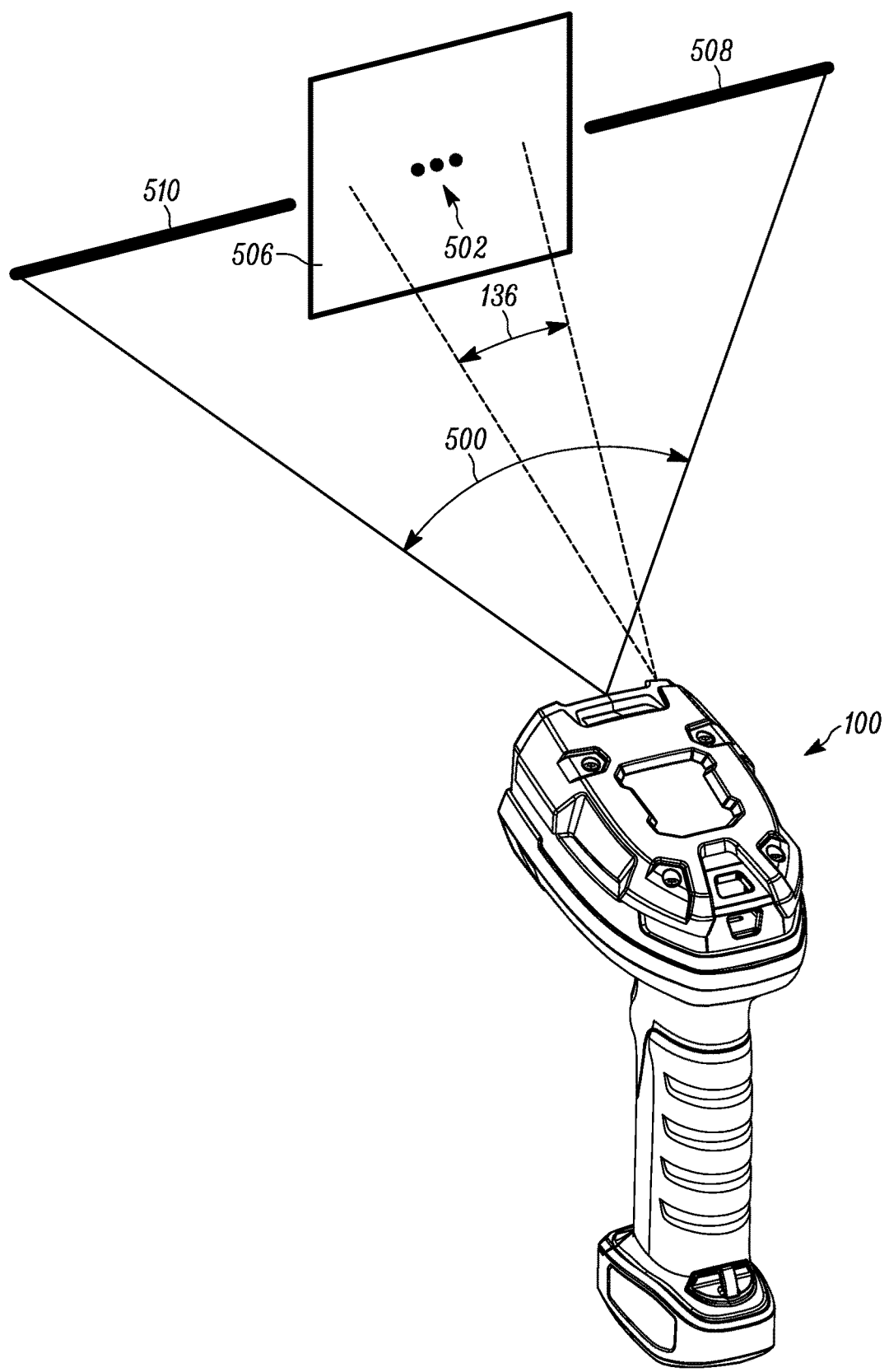
FIGS. 15-16 illustrate projections of the aiming light pattern of FIG. 10 and fields of view of far imaging assemblies onto working surface, in accordance with embodiments of the present invention.

Given that in some embodiments, portions of the aiming light pattern 500 can be configured to provide an indication of the respective fields of view, it may further be preferably to configure the pattern 500 in ways that reduce confusion of with respect to the represented fields of view. In some embodiments, this is achieved by separating the second portion 504 into a first sub-portion 508 and a second sub-portion 510, with both sub-portions being separated by a space 512 having a distance $W_3$ (see FIG. 10). Referring to FIG. 15, preferably, the distance $W_3$ is selected such that when the aiming light pattern 500 is projected on a working surface 506 that is positioned within the far working distance range, each of the first sub-portion 508 and the second sub-portion 510 is entirely outside of the first FOV 136. More preferably, distance $W_3$ is selected such that when the aiming light pattern 500 is projected on a working surface 506 that is positioned at the far end FWD2 of the far working distance range, each of the first sub-portion 508 and the second sub-portion 510 is at least 12 inches away from the first FOV 136 (the measurement being edge to edge). It should be understood that while both the first sub-portion 508 and the second sub-portion 510 are separated by a space 512 which does not necessarily receive illumination from the second portion of the 504 of the aiming light pattern 500, aiming illumination provided by another portion (e.g., first portion 502) may still occupy that space. The result of the aforementioned configuration may be that when the reader is used to read barcodes positioned within the far working distance range (and particularly within the distal half of the far working distance range) first sub-portion 508 and second sub-portion 510 are cast relatively far away from the operating FOV. Consequently, the operator is likely to disregard those these sub-portions, concentrating on other markers, such as those provided by the first portion 502.

Figure 16:
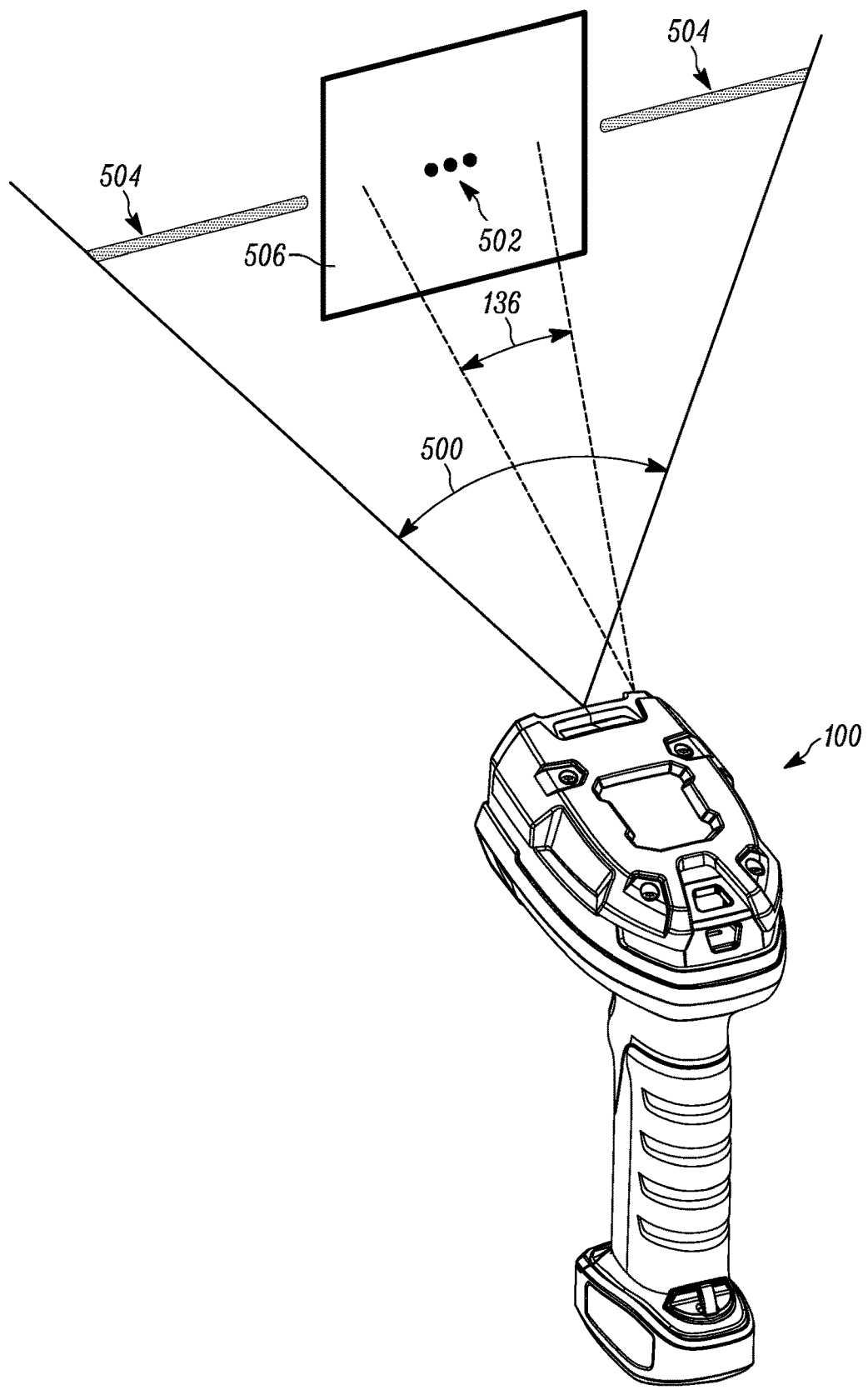

In some embodiments, the intensity of the first portion 502 relative to the second portion 504 can be varied to assist the operator in focusing on the appropriate portion(s). Referring to FIG. 16, the aiming light assembly can be configured such that the intensity of the first portion 502 is greater than the intensity of the second portion 504. Implementing this configuration can result in an advantageous dimming of the second portion 504 as the distance between the reader 10 and the working surface 506 increases. As a result of this dimming, as the operator reaches a certain distance away from the working surface, he or she is less likely to clearly discern the second portion 504 and conversely is more likely to focus on the more prominent first portion 502.

In some embodiments, the aiming light pattern is configured such that, when it is projected on a working surface positioned at the far end of the near working distance NWD2, the second portion 504 has a light intensity of 5 foot-candles (ft-c) to 10 ft-c, and the first portion 502 has a light intensity that is greater than the second portion 504. In some embodiments, the aiming light pattern is configured such that, when it is projected on a working surface positioned at the far end of the near working distance NWD2, the second portion 504 has a light intensity of 5 foot-candles (ft-c) to 10 ft-c, and the first portion 502 has a light intensity of 700 to 1500 ft-c. In some embodiments, the aiming light pattern is configured such that, when it is projected on a working surface positioned at the far end of the far working distance FWD2, the second portion 504 has a light intensity of 0.05 to 0.1 ft-c, and the first portion 502 has a light intensity of 30 to 50 ft-c.

In still other embodiments, the intensity of the second portion 504 may be configured based at least in part on ambient lighting conditions. It has been recognized that, on average, humans have the ability to discern contrast at a light intensity ratio of 10:1 or greater. Accordingly, in an environment that has ambient light intensity of 50 ft-c, a light pattern having a light intensity of 40 ft-c will be sufficiently visible while a light pattern having a light intensity of 5 ft-c will be marginally. Taking this into consideration, in some embodiments, the aiming light pattern is configured such that, when it is projected on a working surface positioned at the far end of the near working distance NWD2, the second portion 504 has a light intensity that is one tenth of the light intensity of the ambient environment. In some other embodiments, the aiming light pattern is configured such that, when it is projected on a working surface positioned at the far end of the near working distance NWD2, the second portion 504 has a light intensity that is between one fifth and one fifteenth of the light intensity of the ambient environment.

It should be understood that the above description related to the dimming (as a function of distance) of the second portion 504 applies to the illuminated part(s) of the second portion. Thus, in the embodiment of the second section 504 shown in FIG. 10, the first and second sub-portions 508 would be subject to the aforementioned dimming characteristics, while the space 512 would be disregarded as it is not illuminated.

Further to the above, it is preferable to have the first portion 502 of the aiming light pattern 500 remain visible throughout the entire working range of the reader 100. Accordingly, in some embodiments, the aiming light pattern 500 is configured such that, when it is projected on a working surface positioned at the far end of the far working distance FWD2, the first portion 502 has a light intensity that is greater than 5 ft-c. In some embodiments, the aiming light pattern 500 is configured such that, when it is projected on a working surface positioned at the far end of the far working distance FWD2, the first portion 502 has a light intensity that is 30 to 50 ft-c. Combining these configurations for the first and second portions 502, 504 can help ensure that only relevant portions of the aiming light pattern 500 are visible at the appropriate working distances. In other words, when working at a relatively close distance (e.g., within the near working range), the entire aiming light pattern 500 appears bright enough to be seen by the other. On the other hand, when working at a relatively far distance (e.g., the distal half of the far working range), only first portion 504 of the aiming light pattern 500 (that can be designed provide an indication of the boundaries of the far FOV) remains visible.

While in some cases, the upper limit of the light intensity output by any part of the aiming light pattern 500 may be limited by the maximum performance of hardware, in other cases, it may be preferable to take human eye safety into account. Thus, in some embodiments where the aiming light source is a laser light source, the aiming light pattern 500 is configured to comply with IEC 60825 (which is incorporated herein by reference in its entirety), class 2, laser standard for eye safety. In such embodiments, the aiming light pattern is configured such that the combined power of any part of the aiming light pattern that is encompassed by a 7 mrad cone, as measured from the aiming light assembly (e.g., from the beam shaper), is 1 mW or less. Given such constraints, the aiming light pattern can be configured in a variety of embodiment where the total output of either of the first and second portions 502, 504, or the entire aiming light pattern 500 still remains greater than 1 mW. For example, as shown in FIG. 10, the aiming light pattern can be configured such that (1) each dot of the first portion 502 has a power of less than 1 mW, (2) each dot is spaced apart from the other of the two dots such that no part of the first portion 502 that is encompassed by a 7 mrad cone exceeds 1 mW, and (3) the power of any two dots combined exceeds 1 mW.

Figure 17A:
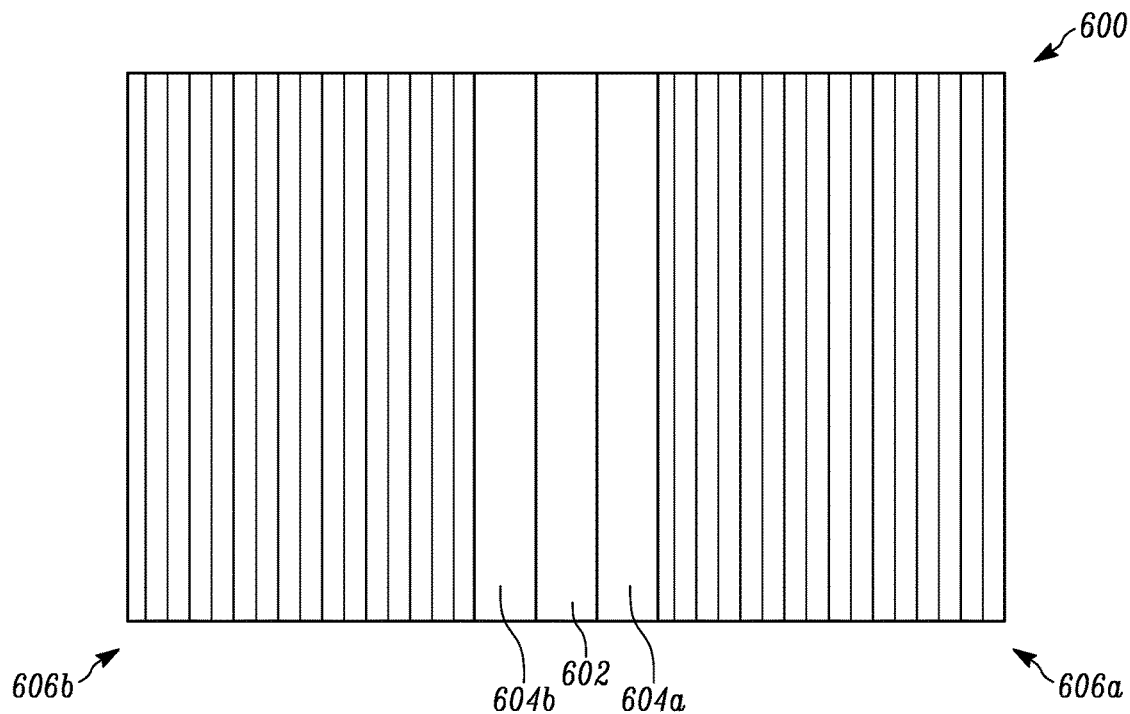
FIG. 17A illustrates a beam shaper, in accordance with an embodiment of the present invention.
Figure 17B:
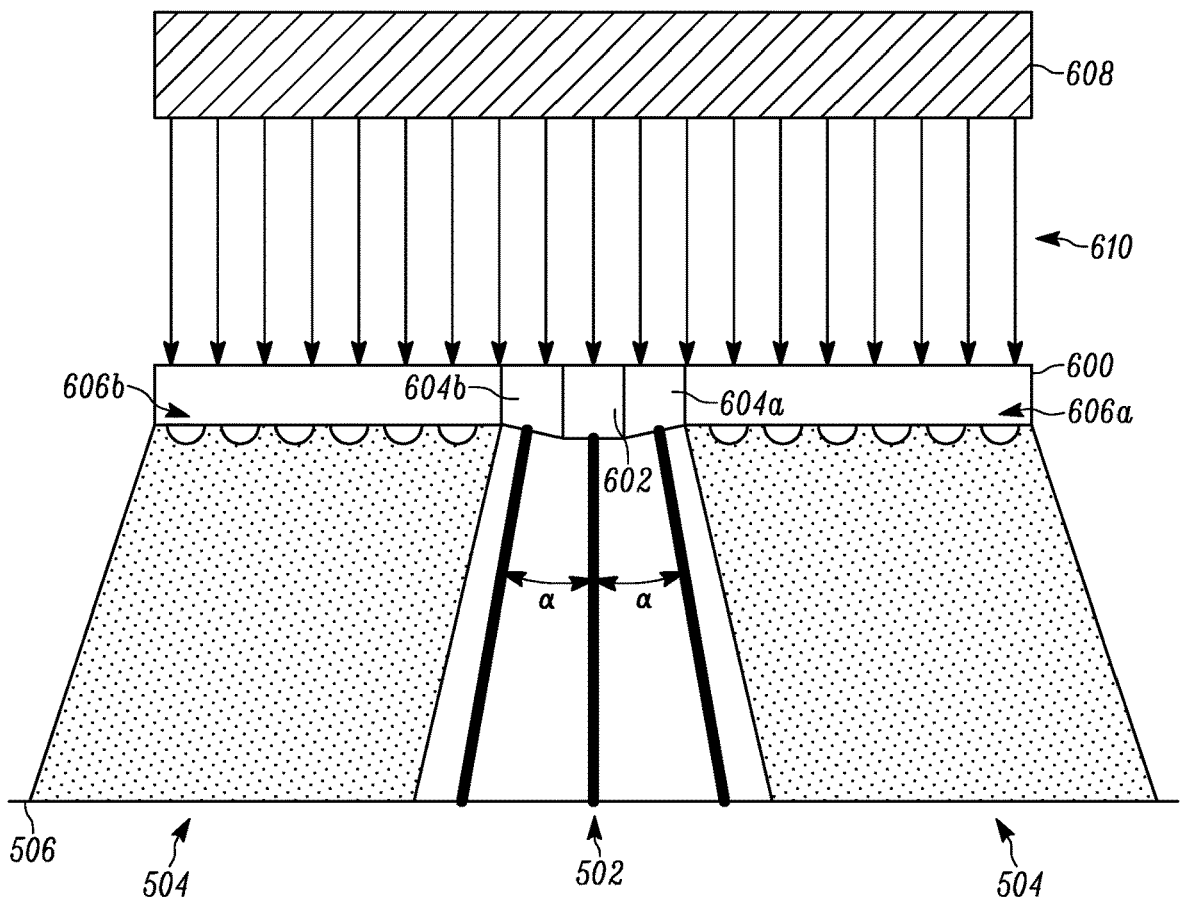
FIG. 17B illustrates the beam shaper of FIG. 17A in use, in accordance with an embodiment of the present invention.

The exemplary aiming pattern 500 can, in some embodiments, be attained by utilizing a beam shaper 600 that includes a pass-through component 602 and a plurality of prisms 604a, 604b positioned between two sets of micro-lenses 606a, 606b (also referred to as micro-lens arrays), as shown in FIGS. 17A and 17B. When a laser aiming light source 608 directs a collimated beam of aiming light 610 onto the beam shaper 600, (1) the pass-through component 602 acts to pass some light directly, resulting in the central dot of the first pattern 502, (2) the prisms 604a, 604b act to respectively redirect some light at respective angles, resulting in the two peripheral dots of the first pattern 502, and (3) the micro-lenses 606a, 606b act to respectively redirect and disperse some light at respective angles, resulting in the first and second portions 508, 510 of the second portion 504. In a preferred embodiment, the pass-through element 602 and the prisms 604a, 604b are configured to split a portion of the beam 610 into three collimated beams separated by a degrees, where a is between 0.2 degrees and 0.6 degrees. It will be appreciated that three is merely exemplary and in other embodiments, the beam 610 may be altered such that two or more beams are output as the first portion.

It will be appreciated that while the beam shaper 600 is shown as comprising the aforementioned components, other known optical shaping and redirection elements can also be used to achieve a desired aiming light pattern. Additionally, while the aiming light pattern is exemplarily shown as being linear, principles described herein with respect to utilizing the multiple portions of the aiming patterns and/or limiting the power in a given area can be equally applied to other linear and/or non-linear aiming patterns.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. Additionally, the described embodiments/examples/implementations should not be interpreted as mutually exclusive, and should instead be understood as potentially combinable if such combinations are permissive in any way. In other words, any feature disclosed in any of the aforementioned embodiments/examples/implementations may be included in any of the other aforementioned embodiments/examples/implementations. Moreover, no steps of any method disclosed herein shall be understood to have any specific order unless it is expressly stated that no other order is possible or required by the remaining steps of the respective method. Also, at least some of the figures may or may not be drawn to scale.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

We claim:

1. A barcode reader comprising:
a housing defining a cavity;
a first imaging assembly positioned within the cavity, the first imaging assembly having a first linear imaging sensor and a first lens assembly, the first imaging assembly having a first linear field of view (FOV);
a second imaging assembly positioned within the cavity, the second imaging assembly having a second linear imaging sensor and a second lens assembly, the second imaging assembly being separate from the first imaging assembly, the second imaging assembly having a second linear FOV; and
an aiming assembly positioned within the cavity, the aiming assembly having an aiming illumination source and an aiming beam shaper, the aiming assembly being configured to emit a linear aiming light pattern,
wherein the first linear FOV, the second linear FOV, and the linear aiming light pattern are coplanar.

2. The barcode reader of claim 1, wherein the aiming assembly is positioned between the first imaging assembly and the second imaging assembly.

3. The barcode reader of claim 2, wherein:
the first imaging assembly has a first working distance range,
the second imaging assembly has a second working distance range, the first working distance range extending farther than the second working distance range, and
the aiming assembly is positioned closer to the second imaging assembly than the first imaging assembly.

4. The barcode reader of claim 3, wherein the first linear FOV is narrower than the second linear FOV.

5. The barcode reader of claim 4, wherein the total power of the laser light is greater than 5 mw.

6. The barcode reader of claim 1, wherein the aiming illumination source emits laser light having a wavelength between 630 nm and 655 nm.

7. The barcode reader of claim 1, wherein the first linear imaging sensor and the second linear imaging sensor are positioned on a first substrate, and wherein a distance between the first linear imaging sensor and the first lens assembly is different from a distance between the second linear imaging sensor and the second lens assembly.

8. The barcode reader of claim 1, further comprising an illumination assembly positioned within the cavity, the illumination assembly being positioned between the first imaging assembly and the second imaging assembly.

9. The barcode reader of claim 1, further comprising a printed circuit board positioned within the housing, the printed circuit board positioned along a printed circuit board plane, wherein each of a first linear FOV plane, a second linear FOV plane, and a linear aiming light pattern plane is obliquely angled relative to the printed circuit board plane.

10. A method of manufacturing a barcode reader, the method comprising:
providing a housing having a cavity;
positioning a first imaging assembly within the cavity, the first imaging assembly having a first linear imaging sensor and a first lens assembly, the first imaging assembly being positioned such that it has a first linear field of view (FOV);
positioning a second imaging assembly within the cavity, the second imaging assembly having a second linear imaging sensor and a second lens assembly, the second imaging assembly being separate from the first imaging assembly, the second imaging assembly being positioned such that it has a second linear FOV; and
positioning an aiming assembly within the cavity, the aiming assembly having an aiming illumination source and an aiming beam shaper, the aiming assembly being configured to emit a linear aiming light pattern,
wherein the first linear FOV, the second linear FOV, and the linear aiming light pattern extend over the same plane.

11. The method of claim 10, wherein the aiming assembly is positioned between the first imaging assembly and the second imaging assembly.

12. The method of claim 11, wherein:
the first imaging assembly has a first working distance range,
the second imaging assembly has a second working distance range, the first working distance range extending farther than the second working distance range, and
the aiming assembly is positioned closer to the second imaging assembly than the first imaging assembly.

13. The method of claim 10, wherein the first linear imaging sensor and the second linear imaging sensor are positioned on a first substrate, and wherein a distance between the first linear imaging sensor and the first lens assembly is different from a distance between the second linear imaging sensor and the second lens assembly.

14. The method of claim 10, further comprising:
positioning a printed circuit board within the housing, the printed circuit board being positioned along a printed circuit board plane, wherein each of a first linear FOV plane, a second linear FOV plane, and a linear aiming light pattern plane is obliquely angled relative to the printed circuit board plane.

15. The method of claim 10, wherein the first linear FOV is narrower than the second linear FOV.

16. The method of claim 10, wherein the aiming illumination source emits laser light having a wavelength between 630 nm and 655 nm.

17. The method of claim 10, wherein the total power of the laser light is greater than 5 mw.

18. The method of claim 10, further comprising:
projecting the linear aiming light pattern on a working surface;
adjusting the first imaging assembly such that the first linear FOV is coplanar with the linear aiming light pattern; and
adjusting the second imaging assembly such that the second linear FOV is coplanar with the linear aiming light pattern.

19. The method of claim 18, wherein the operation of adjusting the first imaging assembly includes adjusting a physical position of the first lens assembly until a response of the first linear imaging sensor is within a first predetermined threshold of a first peak response.

20. The method of claim 19, wherein the operation of adjusting the second imaging assembly includes adjusting a physical position of the second lens assembly until a response of the second linear imaging sensor is within a second predetermined threshold of a second peak response.

\* \* \* \* \*